US012105773B2

(12) United States Patent
Li et al.

(10) Patent No.: US 12,105,773 B2
(45) Date of Patent: Oct. 1, 2024

(54) SEMANTIC RELATION PRESERVING KNOWLEDGE DISTILLATION FOR IMAGE-TO-IMAGE TRANSLATION

(71) Applicant: L'Oreal, Paris (FR)

(72) Inventors: Zeqi Li, Toronto (CA); Ruowei Jiang, Toronto (CA); Parham Aarabi, Richmond Hill (CA)

(73) Assignee: L'Oreal, Paris (FR)

( * ) Notice: Subject to any disclaimer, the term of this patent is extended or adjusted under 35 U.S.C. 154(b) by 330 days.

(21) Appl. No.: 17/361,779

(22) Filed: Jun. 29, 2021

(65) Prior Publication Data

US 2022/0004803 A1 Jan. 6, 2022

Related U.S. Application Data

(60) Provisional application No. 63/045,291, filed on Jun. 29, 2020.

(30) Foreign Application Priority Data

Sep. 18, 2020 (FR) ...................................... 2009478

(51) Int. Cl.
*G06N 5/02* (2023.01)
*G06F 18/22* (2023.01)
(Continued)

(52) U.S. Cl.
CPC .............. *G06F 18/22* (2023.01); *G06N 3/04* (2013.01); *G06N 5/02* (2013.01); *G06Q 30/0631* (2013.01);
(Continued)

(58) Field of Classification Search
None
See application file for complete search history.

(56) References Cited

U.S. PATENT DOCUMENTS

| 10,713,704 B2* | 7/2020 | Aarabi | G06Q 30/0201 |
| 2020/0074292 A1* | 3/2020 | Kurata | G06N 3/044 |

OTHER PUBLICATIONS

LIT: Learned Intermediate Representation Training for Model Compression, by Koratana et al., Proceedings of the 36 th International Conference on Machine Learning, Long Beach, California, PMLR 97, 2019. Copyright 2019 by the author(s). (Year: 2019).*

(Continued)

*Primary Examiner* — Vikkram Bali
(74) *Attorney, Agent, or Firm* — Oblon, McClelland, Maier & Neustadt, L.L.P.

(57) ABSTRACT

GANs based generators are useful to perform image to image translations. GANs models have large storage sizes and resource use requirements such that they are too large to be deployed directly on mobile devices. Systems and methods define through conditioning a student GANs model having a student generator that is scaled downwardly from a teacher GANs model (and generator) using knowledge distillation. A semantic relation knowledge distillation loss is used to transfer semantic knowledge from an intermediate layer of the teacher to an intermediate layer of the student. Student generators thus defined are stored and executed by mobile devices such as smartphones and laptops to provide augmented reality experiences. Effects are simulated on images, including makeup, hair, nail and age simulation effects.

19 Claims, 9 Drawing Sheets

(51) Int. Cl.
   *G06N 3/04*    (2023.01)
   *G06Q 30/0601* (2023.01)
   *G06T 19/00*   (2011.01)

(52) U.S. Cl.
   CPC ....... *G06Q 30/0643* (2013.01); *G06T 19/006* (2013.01)

(56) References Cited

OTHER PUBLICATIONS

GAN Compression: Efficient Architectures for Interactive Conditional GANs, by Li et al., CVRP 2020 paper, IEEE Xplore, Computer vision foundation, pp. 5284-5294 (Year: 2020).*
StarGAN: Unified Generative Adversarial Networks for Multi-Domain Image-to-Image Translation, by Choi et al., arXiv: 1711.09020v3 [cs.CV] Sep. 21, 218 (Year: 2018).*
Brock, A., Donahue, J., Simonyan, K.: Large scale GAN training for high fidelity natural image synthesis. In: International Conference on Learning Representations (2019).
Chen, G., Choi, W., Yu, X., Han, T., Chandraker, M.: Learning efficient object detection models with knowledge distillation. In: Guyon, I., Luxburg, U.V., Bengio, S., Wallach, H., Fergus, R., Vishwanathan, S., Garnett, R. (eds.) Advances in Neural Information Processing Systems 30, pp. 742-751. Curran Associates, Inc. (2017), URL: papers.nips.cc/paper/6676-learning-efficient-object-detection-models-with-knowledge-distillation.pdf.
Chen, Y., Yang, T., Zhang, X., Meng, G., Pan, C., Sun, J.: Detnas: Backbone search for object detection (2019).
Chen, Y., Wang, N., Zhang, Z.: Darkrank: Accelerating deep metric learning via cross sample similarities transfer. In: Thirty-Second AAAI Conference on Artificial Intelligence (2018).
Choi, Y., Choi, M., Kim, M., Ha, J.W., Kim, S., Choo, J.: Stargan: Unified generative adversarial networks for multi-domain image-to-image translation. In: Proceedings of the IEEE conference on computer vision and pattern recognition. pp.8789-8797 (2018).
Cordts, M., Omran, M., Ramos, S., Rehfeld, T., Enzweiler, M., Benenson, R., Franke, U., Roth, S., Schiele, B.: The cityscapes dataset for semantic urban scene understanding. In: Proceedings of the IEEE conference on computer vision and pattern recognition. pp. 3213-3223 (2016).
Deng, J., Dong, W., Socher, R., Li. L.J., Li, K., Fei-Fei, L.: Imagenet: A large-scale hierarchical image database. In: 2009 IEEE conference on computer vision and pattern recognition. pp. 248-255. Ieee (2009).
Goodfellow, I., Pouget-Abadie, J., Mirza, M., Xu, B., Warde-Farley, D., Ozair, S., Courville, A., Bengio, Y.: Generative adversarial nets. In: Advances in neural information processing systems. pp. 2672-2680 (2014).
Han, S., Mao, H., Dally, W.J.: Deep compression: Compressing deep neural network with pruning, trained quantization and human coding. In: Bengio, Y., Le-Cun, Y. (eds.) 4th International Conference on Learning Representations, ICLR 2016, San Juan, Puerto Rico, May 2-4, 2016, Conference Track Proceedings (2016), URL: arxiv.org/abs/1510.00149.
He, Y., Lin. J., Liu, Z., Wang, H., Li, L.J., Han, S.: Amc: Automl for model compression and acceleration on mobile devices. In: Proceedings of the European Conference on Computer Vision (ECCV). pp. 784-800 (2018).
Heusel, M., Ramsauer, H., Unterthiner, T., Nessler, B., Hochreiter, S.: Gans trained by a two time-scale update rule converge to a local nash equilibrium. In: Advances in neural information processing systems. pp. 6626-6637 (2017).
Hinton, G., Vinyals, O., Dean, J.: Distilling the knowledge in a neural network. arXiv preprint arXiv:1503.02531 (2015).
Howard, A., Sandler, M., Chu, G., Chen, L.C., Chen, B., Tan, M., Wang, W., Zhu, Y., Pang, R., Vasudevan, V., et al.: Searching for mobilenetv3. In: Proceedings of the IEEE International Conference on Computer Vision. pp. 1314-1324 (2019).
Howard, A.G., Zhu, M., Chen, B., Kalenichenko, D., Wang, W., Weyand, T., Andreetto, M., Adam, H.: Mobilenets: Efficient convolutional neural networks for mobile vision applications. arXiv preprint arXiv:1704.04861 (2017).
Isola, P., Zhu, J.Y., Zhou, T., Efros, A.A.: Image-to-image translation with conditional adversarial networks. In: Proceedings of the IEEE conference on computer vision and pattern recognition. pp. 1125-1134 (2017).
Krizhevsky, A., Sutskever, I., Hinton, G.E.: Imagenet classification with deep convolutional neural networks. In: Advances in neural information processing systems. pp. 1097-1105 (2012).
Ledig, C., Theis, L., Huszar, F., Caballero, J., Cunningham, A., Acosta, A., Aitken, A., Tejani, A., Totz, J., Wang, Z., et al.: Photo-realistic single image super-resolution using a generative adversarial network. In: Proceedings of the IEEE conference on computer vision and pattern recognition. pp. 4681-4690 (2017).
Lin, T., Maire, M., Belongie, S.J., Hays, J., Perona, P., Ramanan, D., Dollar, P., Zitnick, C.L.: Microsoft COCO: common objects in context. In: Fleet, D.J., Pajdla, T., Schiele, B., Tuytelaars, T. (eds.) Computer Vision—ECCV 2014—13th European Conference, Zurich, Switzerland, Sep. 6-12, 2014, Proceedings, Part V. Lecture Notes in Computer Science, vol. 8693, pp. 740-755. Springer (2014). URL: doi.org/10.1007/978-3-319-10602-1 48.
Liu, C., Chen, L.C., Schroff, F., Adam, H., Hua, W., Yuille, A.L., Fei-Fei, L.: Auto-deeplab: Hierarchical neural architecture search for semantic image segmentation. In: The IEEE Conference on Computer Vision and Pattern Recognition (CVPR) (Jun. 2019).
Liu, Y., Chen, K., Liu, C., Qin, Z., Luo, Z., Wang, J.: Structured knowledge distillation for semantic segmentation. In: Proceedings of the IEEE Conference on Computer Vision and Pattern Recognition. pp. 2604-2613 (2019).
Luo, J.H., Wu, J., Lin, W.: Thinet: A filter level pruning method for deep neural network compression. In: Proceedings of the IEEE international conference on computer vision. pp. 5058-5066 (2017).
Park, W., Kim, D., Lu, Y., Cho, M.: Relational knowledge distillation. In: Proceedings of the IEEE Conference on Computer Vision and Pattern Recognition. pp. 3967-3976 (2019).
Peng, B., Jin, X., Liu, J., Li, D., Wu, Y., Liu, Y., Zhou, S., Zhang, Z.: Correlation congruence for knowledge distillation. In: Proceedings of the IEEE International Conference on Computer Vision. pp. 5007-5016 (2019).
Redmon, J., Farhadi, A.: Yolov3: An incremental improvement. arXiv preprint arXiv:1804.02767 (2018).
Sandler, M., Howard, A., Zhu, M., Zhmoginov, A., Chen, L.C.: Mobilenetv2: Inverted residuals and linear bottlenecks. In: Proceedings of the IEEE conference on computer vision and pattern recognition. pp. 4510-4520 (2018).
Shaham, T.R., Dekel, T., Michaeli, T.: Singan: Learning a generative model from a single natural image. In: Proceedings of the IEEE International Conference on Computer Vision. pp. 4570-4580 (2019).
Shu, H., Wang, Y., Jia, X., Han, K., Chen, H., Xu, C., Tian, Q., Xu, C.: Co-evolutionary compression for unpaired image translation. In: Proceedings of the IEEE International Conference on Computer Vision. pp. 3235-3244 (2019).
Simonyan, K., Zisserman, A.: Very deep convolutional networks for large-scale image recognition. In: International Conference on Learning Representations (2015).
Tung, F., Mori, G.: Similarity-preserving knowledge distillation. In: Proceedings of the IEEE International Conference on Computer Vision. pp. 1365-1374 (2019).
Zagoruyko, S., Komodakis, N.: Paying more attention to attention: Improving the performance of convolutional neural networks via attention transfer. arXiv preprint arXiv:1612.03928 (2016).
Zhu, J.Y., Park, T., Isola, P., Efros, A.A.: Unpaired image-to-image translation using cycle-consistent adversarial networks. In: Proceedings of the IEEE international conference on computer vision. pp. 2223-2232 (2017).
Diederik P. Kingma and Jimmy Lei Ba. Adam: A method for stochastic optimization. arXiv:1412.6980v9 (2014).

\* cited by examiner

SEMANTIC RELATION PRESERVING KNOWLEDGE DISTILLATION FOR IMAGE-TO-IMAGE TRANSLATION

CROSS-REFERENCE TO RELATED APPLICATIONS

This application claims the benefit of priority from U.S. Provisional Application No. 63/045,291 filed Jun. 29, 2020, and claims the benefit of priority from French Patent Application No. FR 2009478 filed Sep. 18, 2020, the entire contents of each of which are incorporated herein by reference.

FIELD

The application relates to image processing using machine learning and to creating an augmented reality through image processing.

BACKGROUND

Generative adversarial networks (GANs) have shown significant potential in modeling high dimensional distributions of image data, especially on image-to-image translation tasks. However, due to the complexity of these tasks, state-of-the-art models often contain a tremendous amount of parameters, which results in large model size and long inference time.

Practical consumer (user) applications incorporating image-to-image translation tasks are desirable and popular. By way of example, real time virtual makeup applications provide users with an interactive experience in augmented reality with high preservation of identity and detailed realism. Ideally, users would like to have a preview of makeup products (e.g. lipstick or eye shadow) without actually trying them. In addition, virtual try-on's give users a freedom to tune relevant attributes of the product (e.g. color and glossiness) according to their personal preferences.

It is thus desirable to provide GANs-based models for use on typical user devices such as smartphones, tablets, etc. to meet user demands and enhance the user experience.

SUMMARY

In an embodiment, a novel method applies knowledge distillation together with distillation of a semantic relation preserving matrix. In an embodiment, this matrix, derived from the teacher's feature encoding, helps the student model learn better semantic relations. In contrast to existing compression methods designed for classification tasks, in an embodiment, the method herein adapts well to the image-to-image translation task on GANs by stabilizing the training with the guidance.

In an embodiment, GANs based generators perform image to image translations. GANs models have large storage sizes and resource use requirements such that they are too large to be deployed directly on mobile devices. Systems and methods define, through conditioning, a student GANs model having a student generator that is scaled downwardly from a teacher GANs model (and generator) using knowledge distillation. In an embodiment, a semantic relation knowledge distillation loss is used to transfer semantic knowledge from an intermediate layer of the teacher (e.g. a last layer of an encoder component of the teacher generator) to an intermediate layer of the student (e.g. a last layer of an encoder component of the student generator). In an embodiment, student generators thus defined are stored and executed by mobile devices such as smartphones and laptops to provide augmented reality experiences. In an embodiment, effects simulated on images, including makeup, hair, nail, age simulation effects, and the like.

Figure 1:
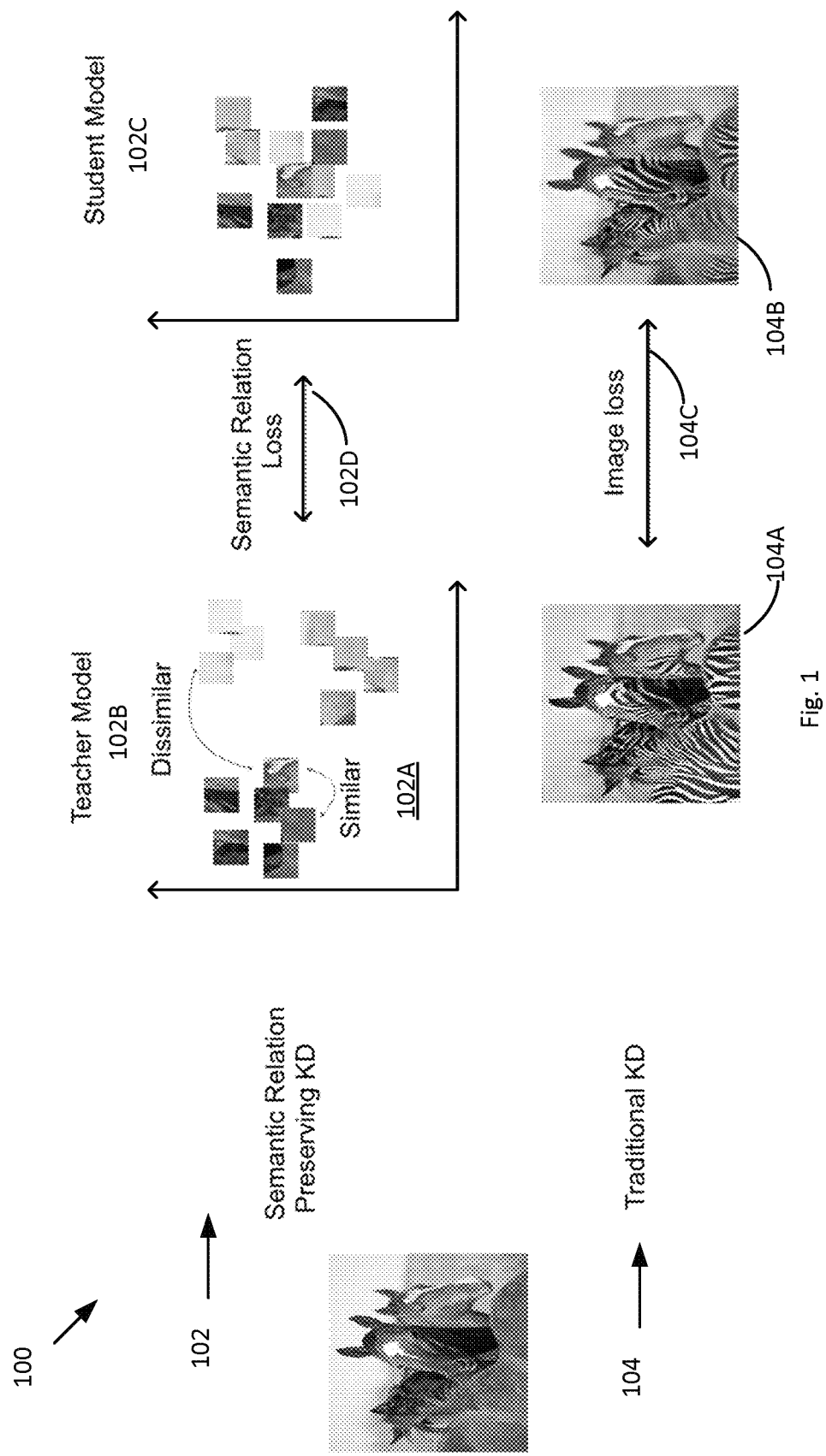
FIG. 1 is an illustration of a present approach as taught herein according to an embodiment contrasted with a known approach.

The present concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

DETAILED DESCRIPTION

1. Introduction

In brief, generative adversarial networks (GANs) [8] are useful in a variety of image tasks including image to image translations but challenges exist to employing GANs such as on a target device such as a mobile device (e.g. on a consumer user device such as a smartphone or tablet.

First of all GAN models are generally too large to be deployed directly on mobile devices which have limited storage and computation capability. Secondly, applying existing compression methods designed for regular discriminative convolutional neural networks on GANs does not work well because GANs are quite different from those models in structure and training scheme. Thirdly, the compressed model must preserve a similar level of performance compared to the original model in terms of fidelity of the generated images and be smaller and faster enough for it to run on a target device.

Knowledge distillation techniques are known to transfer knowledge from a teacher model to a student model, where the student model is often chosen to be a narrower or shallower version of the teacher model. There are challenges when applying traditional ("vanilla") knowledge distillation specifically on GANs. Traditional knowledge distillation transfers knowledge of the teacher model from the output such as the probability distribution for classification. In the case of GANs, the outputs, which are the generated images cannot provide informative guidance for the student's training. Instead, we propose to transfer the intermediate representation, at the end of an encoder component, of the teacher to a student model. Since the teacher and student models are trained separately, their intermediate representations are mostly in different latent spaces (i.e. they have different numbers of channels). So the challenge is to properly match the two latent spaces to improve traditional knowledge distillation on GANs. However, methods like projecting vectors from one space into the other is often difficult. Therefore, we need to find another way to compare vectors from the teacher's latent space and the student's latent space.

In more detail, GANs have presented significant potential in modeling high dimensional distributions of image data, on a variety of visual tasks. Many of these tasks, such as style-transfer [31, 15] and super-resolution [17], are considered to be image-to-image translation tasks, in which we train a model to map images from one domain to another. (It will be understood that a meaningful feature in an image defines an "attribute", such as, hair colour, age, gender, facial expression, etc. and that an "attribute value" is a particular example of a value of an attribute (e.g. blond/black/brown/red, 20/50, male/female, happy/sad/angry, etc.). A "domain" then is a set of images sharing a same attribute value.) The community has shown success in researching solutions to generate high fidelity images [1, 26] and dealing with unpaired data [31]. The success in these works has also led to a popular trend of developing mobile applications based on generative models. However, little work has been done in making these models efficient on mobile devices. As a result, the state-of-the-art GAN models are often large and slow on resource-limited edge devices. For instance, a CycleGAN [31] model needs 2.69 seconds to process one image of resolution 256×256 on a single CPU core of Intel® Xeon® E5-2686, with the model being 44M large.

With achievements of convolutional neural networks (CNNs), many works [9, 25, 14, 10, 13] for model compression have been proposed to improve model efficiency in a variety of computer vision tasks including classification, object detection and semantic segmentation. In 2016, Han et al. [9] proposed a three-stage pipeline that first prunes the model by cutting down less important connections and then quantizes the weights and applies Huffman encoding. They successfully reduced AlexNet [16] and VGG-16 [28] by 35× to 49× on the ImageNet dataset [7]. This method, with a complex training pipeline, requires a great amount of manual efforts in each stage. In [25, 14], efforts have been dedicated to improving model efficiency by redesigning convolutional layers into separable convolutional layers. Redesigning network architecture often requires domain experts to explore the large design space and conduct a significant amount of experiments.

Later works such as [10, 13], have leveraged techniques in neural architectural search and reinforcement learning to efficiently reduce the amount of such manual efforts by performing pruning and network designing based on a trained agents predictions. Upon successful results in compressing networks for classification tasks, research works [3, 24, 19] have further extended the aforementioned techniques to object detection and semantic segmentation.

However, the aforementioned solutions do not adapt well to GANs, as GANs typically demand excessive amounts of training processes and manual design efforts. The training of generative adversarial networks is usually harder and less stable due to the design of alternating training strategy for the discriminator and the generator. Therefore, we explore methods that not only improve the model's efficiency but also provide guidance while training. Hinton et al. [12] reinvented the concept of knowledge distillation to transfer the dark knowledge from an ensemble teacher model to a single student model, which demonstrated the potential of utilizing knowledge distillation in model compression. In this setting, inexplicit and intermediate information such as probability distribution from the teacher's network can be leveraged at training time to guide the student. Given the intuition of this concept, knowledge distillation naturally fits our objective of compressing a GAN generator with a guided training procedure.

In an embodiment, technologies and methodologies apply knowledge distillation on image-to-image translation tasks and employ a novel approach to distill information of semantic relationships from teacher to student. In an embodiment, our hypothesis is that, given a feature tensor, feature pixels of the same semantic class may have similar activation patterns while feature pixels of different semantic classes may be dissimilar. Accordingly, referring to visualization 100 in FIG. 1, in an embodiment, in a top row 102, semantic relations 102A (e.g. (similarities, dissimilarities) learned in a teacher model 102B are transferred to a student model 102C using semantic relation loss preservation 102D. In high dimensional space, feature encoding for pixels of the same semantic class may locate closer. The bottom row 104 shows how traditional knowledge distillation would work on image-to-image (e.g. 104A to 104B) translation tasks where traditional knowledge distillation is based on image loss preservation 104C.

For example, on the horse-to-zebra task, feature tensors of horses may locate closer but far from other background pixels such as sky and grass in high dimensional space. A well-trained teacher model is able to capture these correlations better among different semantic pixels at both dataset and image level. We will also demonstrate evidence to support this intuition.

In an embodiment, a novel method of applying knowledge distillation in compressing GAN generators on image-to-image translation task includes distilling the semantic relations. The student model's pixel pairwise similarities are trained in a supervised setting by the teacher's. Further, the potential of this method is experimentally demonstrated on 5 different image-to-image translation benchmark datasets. Our results, both qualitatively and quantitatively, evidently show that our method trains the student model to be on par with and sometimes better than the original teacher model.

2. Related Work

2.1 GANs for Image-to-Image Translation

Along with the success of GANs in modeling high dimensional data, image-to-image translation tasks are dominated by GANs nowadays due to GANs' superiority in generating images of high fidelity and extendibility on different data domains. In [15], authors proposed a model known as Pix2Pix applying conditional GANs on paired image-to-image translation tasks such as transferring from sketches/semantic labels to photos. A subsequent work CycleGAN [31], tackling unpaired image-to-image translation tasks between two domains, proposed to construct two generators transferring images in both directions and enforce an additional cycle consistency loss during the training. StarGAN [5] has further extended the capability of CycleGAN to the multi-domain translation by adding a domain-specific attribute vector in the input while training the generators.

2.2 Semantic Relation Preserving Knowledge Distillation

There has been a long line of efforts dedicated to transferring knowledge from a teacher model to a student model. Hinton et al. [12] reinvented the concept of knowledge distillation in which a single student model learns the knowledge from an ensemble of separately trained models. Comparing to one-hot output, the information contained within a teacher's soft logits provides more concrete knowledge and helps guide the training of a student model. In addition to classification tasks, this idea has also been widely adopted in numerous computer vision tasks such as object detection and semantic segmentation [2, 20].

Recently, it is observed that learning class relationship enhances model performance non-trivially in various problems. Many works [4, 23, 22, 29] have shown progress in applying similarity and relational learning in a knowledge distillation setting. In [22] and [23], they both demonstrated that correlation among instances can be transferred and well learned in a student model through geometric similarity learning of multiple instances. In [29], they demonstrated empirically that similar activation patterns would appear on images of the same class (e.g. dog). Based on this observation, they proposed to guide the student with a similarity matrix of image instances calculated as the outer product of the teacher's feature encoding of certain layers. However, on the image-to-image translation tasks, image-wise relationships do not give comprehensive information as they are typically images from the same class (e.g. horses, zebras). Might similar correlation patterns exist among semantic pixels? In this work, we explore the idea to retain pixel-wise semantic relation in the student model, by transferring this knowledge from the teacher.

2.3 Model Compression on GANs

Image-to-image translation tasks using generative models are essentially different from classification tasks with discriminative models. Traditional model compression approaches are designed for classification tasks, which do not adapt well to GANs trivially. Another work [27] devoted effort to compressing GAN models through a co-evolutionary strategy of the two generators in CycleGAN [31], resulting in a method that efficiently eliminates redundant convolutional filters.

However, it requires external effort to maintain the quality of generated images by controlling the model compression ratio and other hyper-parameters.

In this work, we aim to reduce the amount of effort needed for hyper-parameter tuning and achieve better image quality while realizing effective compression by transferring semantic knowledge from a well-trained teacher model.

3. Methods

Figure 2:
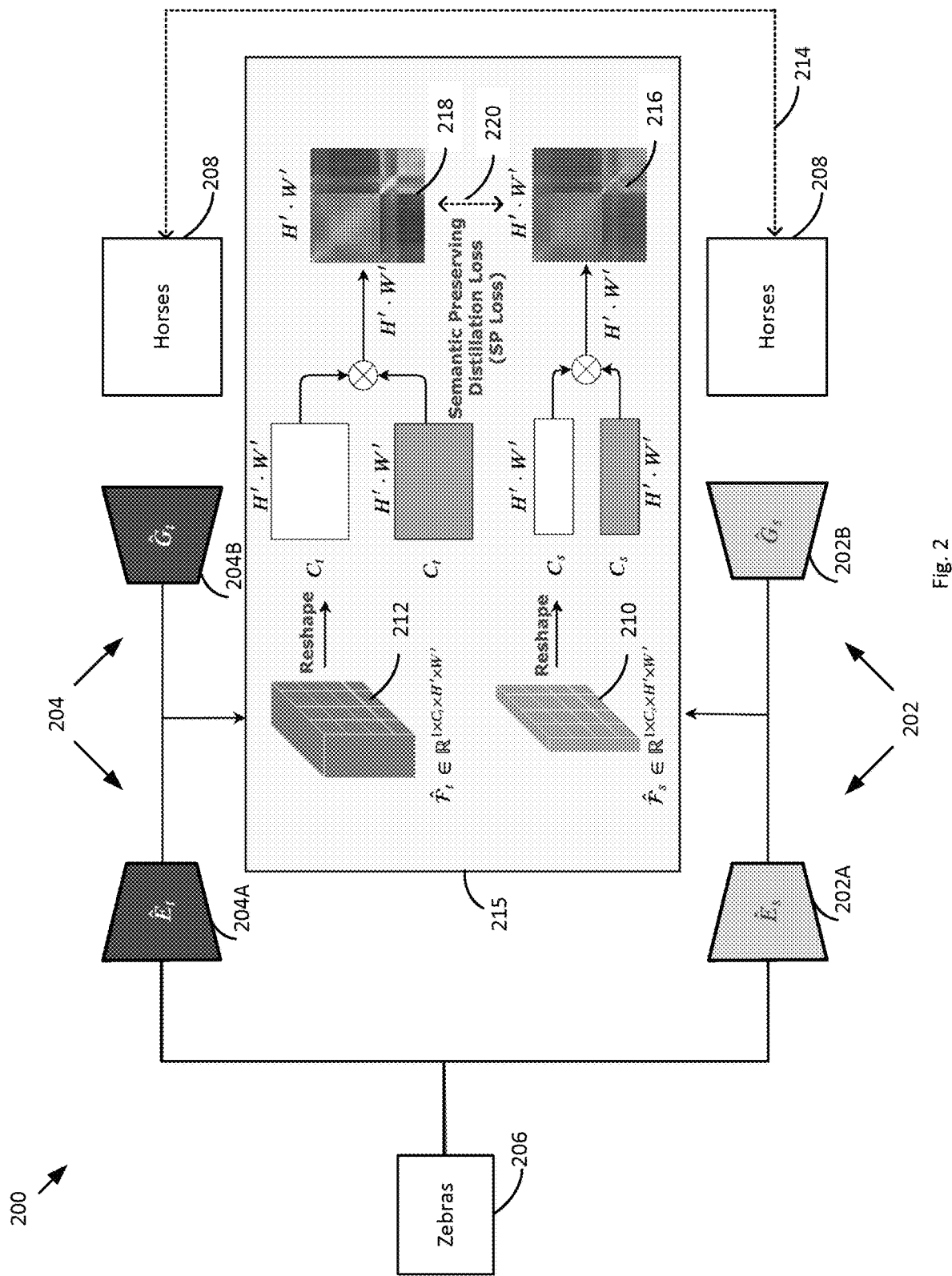
FIG. 2 is an illustration of an overview of a training pipeline in accordance with an example.

In an embodiment, GANs efficiency is improved by utilizing knowledge distillation in compressing the generator. As discussed in the Introduction, the training of GANs is challenging. In addition to the vanilla knowledge distillation loss, we separate each generator into one encoder and one decoder and formulate a semantic preserving loss based on the feature encoding produced by the encoder. FIG. 2 illustrates a schematic overview of a distillation strategy 200 in preserving semantic relationships.

FIG. 2 is simplified in that is shows the knowledge distillation strategy 200 in relation to training a single student model (e.g. its generator $G_s$ 202 comprising its encoder $\hat{E}_s$ 202A and generator $\hat{G}_s$ 202B) using a pre-trained teacher model 204 (e.g. its generator $G_t$ 202 comprising its encoder $\hat{E}_t$ 204A and generator $\hat{G}_t$ 204B) to perform a translation of an image from a first domain space to a second domain space (e.g. zebras 206 to horses 208). In a CycleGANS framework, for example, a second student model and a corresponding pre-trained teacher model are also trained simultaneously (though not shown) to translate an image from the second domain space to the first domain space (e.g. from horses to zebras). Also not shown are the related known functions (losses) for such image to image training (e.g. using CycleGAN or other architecture). Only the features of the knowledge distillation aspect are illustrated for simplicity. In a Pix2Pix framework for example, the single model pair (e.g. the teacher and student model) with respective generators 202B, 204B of FIG. 2 is applicable. As explained below, student feature encoding $\hat{\mathcal{F}}_S$ is denoted 210 in FIG. 2 and teacher feature encoding $\hat{\mathcal{F}}_t$ is denoted 212.

It is understood that the student and teacher models 202 and 204 are of a same general network architecture with the student 202 scaled downward relative to the teacher 204. The teacher and student models are defined in accordance with a common (i.e. the same) network architecture in terms of building blocks and connections. "Building blocks" means processing units such as downsample blocks, residual blocks, and upsample blocks used in the network. "Connections" means how each layer/building blocks is connected/routed. The student model is a scaled-down version of the teacher model in terms of width, depth or both width and depth. Width means the number of filters in each layer. Depth means the number of residual blocks in the network. For example, a teacher model denoted as Resnet9, ngf64 means it has a residual depth of 9 and filter width 64. So an example student model could be denoted as Resnet6, ngf16, where both width and depth are scaled. Another example is Resnet9, ngf32 where the width is preserved but the depth is scaled. Formally, a scaling coefficient may be introduced to characterize the two models S and T taking into account that width and depth numbers are typically constrained to whole numbers (e.g. positive integers) and may have other constraints: $S(w, d)=T(\alpha^*w, \beta^*d)$ where both $\alpha$ and $\beta$ are applicable scaling factors.

At an intermediate layer, we represent semantic relations by calculating pairwise activation similarities on pixels of the feature encoding and transfer the knowledge via a distillation loss on the similarity matrices. This loss can be added in addition to traditional distillation loss (line 214) on the final generated images. The semantic relation activation matrix is calculated as the outer product of the feature encoding. A distillation loss is used to compare the teacher's activation matrix and the student's matrix. In this section, we will discuss details about how we apply vanilla knowledge distillation and semantic preserving distillation on GANs.

3.1 Vanilla Knowledge Distillation on GANs

In traditional knowledge distillation (for example, as used on discriminative rather than generative models), the task is formulated as:

$$\theta_s = \operatorname*{argmin}_{\theta} \frac{1}{n} \sum_{i=1}^{n} [(1-\alpha)\mathcal{L}(y_i, f_\theta(x_i)) + \alpha \mathcal{L}(f_t(x_i), f_\theta(x_i))], \quad (1)$$

where $y_i$ denotes the ground truth for input $x_i$, $f_\theta(x_i)$ and $f_t(x_i)$ denote the student model output and teacher model output respectively. n is the number of inputs and $\alpha$ is a hyperparameter to balance between a teacher's output and the ground truth. Equation (1) encourages the network to minimize two terms: 1) the loss between ground truth and student's output, and 2) the loss between the teacher's output and the students output. The second part of the objective function is designed to help the student learn inexplicit knowledge on different tasks. For example, on a classification task, soft logits with temperature control are matched between the student and the teacher to encourage the student to mimic the teacher.

In the setting of generative adversarial training, an example approach to applying knowledge distillation would be introducing another minimax game between the teacher's generated images $G_t(x)$ and the student's $G_s(x)$:

$$\min_{G_s} \max_{\mathcal{D}_s} (G_s, \mathcal{D}_s) = \alpha(\mathbb{E}_{y \sim \mathcal{P}_{data}(y)}[\log(\mathcal{D}_s(y)] + \quad (2)$$

$$\mathbb{E}_{x \sim \mathcal{P}_{data}(x)}[\log(1 - \mathcal{D}_s(G_s(x))]) + (1-\alpha)\mathcal{L}_{KD},$$

where $$\mathcal{L}_{KD} = \mathbb{E}_{(y \sim P_{data}(G_t(m))}\log D'_s(y)] + \mathbb{E}_{\infty P_{data}(\infty)}[\log(1 - D'_s(G_s(x))], \quad (3)$$

Subscript t and s indicate components of the teacher and the student. $\mathcal{D}_s$ is the discriminator for the student's output and real images while $\mathcal{D}'_s$ differentiate student's output and teacher's, and x and y are real images from each respective class.

Previous works [31, 15] have shown the benefits of mixing a GAN objective with other traditional losses such as L1. Therefore, we apply vanilla knowledge distillation by computing a traditional reconstruction loss comparing teacher's and students output. For example in CycleGAN [31], the original loss is weighted among two GAN losses and one cycle consistency loss. We add the distillation loss only on cycle consistency loss which is an L1 norm loss. Our vanilla knowledge distillation setting has the following objective:

$$\mathcal{L}(G_s, F_s, D_X, D_Y) = \mathcal{L}_{GAN}(G_s, D_Y, X, Y) + \mathcal{L}_{GAN}(F_s, D_X, Y, X) + \quad (4)$$

-continued
$$\alpha \mathcal{L}_{cyc}(G_s, F_s, X, Y) + (1-\alpha)\mathcal{L}_{cyc}(G_s, F_s, X_t, Y_t),$$

where $G_s$ and $F_s$ denote generators transferring from style class X to Y and Y to X respectively. Accordingly, $X_t$ and $Y_t$ are teacher generated reconstruction images. Notations are adapted from [31]. We also apply similar settings in Pix2Pix [15] training.

3.2 Semantic Preserving Loss

We consider a generator G to be composed by two parts: an encoder $\hat{E}$ that encodes the input images and a generator $\hat{G}$ that decodes and generates the output images. We note $y_i$ to be the output image of i-th input $x_i$ where $y_i = G(x) = \hat{G}(\hat{E}(x_i))$.

Semantic Relation Activation Matrix. FIG. 2 shows Semantic Relation Activation Matrix determination block 215 comprising operations as described herein. Tung & Mori [29] demonstrated interestingly distinct activation patterns among image instances of different classes versus image instances of the same class. However, on the image-to-image translation tasks, less information is contained in instances' correlation as they are typically from the same class (e.g. horses, oranges). Our hypothesis is that similarity and dissimilarity might likewise present in the feature encoding of different semantic pixels, which is also more informative on the image-to-image translation tasks. A distillation loss can be introduced to penalize the difference between a teacher and a student's encoded similarity. We represent this activation matrix by the outer product of feature encoding $\mathcal{F}$, (e.g. 212 and 214) similar to [30, 29]. Here, we define the feature encoding $\mathcal{F}^{(i)}$ to be the output matrix of the i-th image example at the last layer of encoder $\hat{E}$:

$$\mathcal{F}_t^{(i)} = \hat{E}_t(x_i); \quad \mathcal{F}_s^{(i)} = \hat{E}_s(x_i), \quad (5)$$

$$\mathcal{F}_t^{(i)} \in \mathbb{R}^{1 \times C_t \times H' \times W'} \to \mathcal{F}_t^{(i)} \in \mathbb{R}^{C_t \times (H' \cdot W')},$$

$$\mathcal{F}_s^{(i)} \in \mathbb{R}^{1 \times C_s \times H' \times W'} \to \mathcal{F}_s^{(i)} \in \mathbb{R}^{C_s \times (H' \cdot W')}, \quad (6)$$

where H' and W' indicate the feature encoding height and width while $C_t/C_x$ are number of channels respectively. We use a batch size of 1. We then calculate semantic relation activation matrices $\mathcal{A} \in \mathbb{R}^{(H' \cdot W') \times (H' \cdot W')}$ as the outer product of $\mathcal{F}$, followed by a row-wise L2 normalization.

$$\hat{\mathcal{A}}_t = \mathcal{F}_t^{(i)} \cdot \mathcal{F}_t^{(i)T}; \quad \hat{\mathcal{A}}_s = \mathcal{F}_s^{(i)} \cdot \mathcal{F}_s^{(i)T}, \quad (7)$$

$$\mathcal{A}_{t[k,:]} = \frac{\hat{\mathcal{A}}_t}{\sqrt{\sum_j \hat{\mathcal{A}}_{t[k,j]}^2}}; \quad \mathcal{A}_{s[k,:]} = \frac{\hat{\mathcal{A}}_s}{\sqrt{\sum_j \hat{\mathcal{A}}_{s[k,j]}^2}};$$

In FIG. 2 $\mathcal{A}_s$ is denoted 216 and $\mathcal{A}_t$ is 218.

Figure 3:
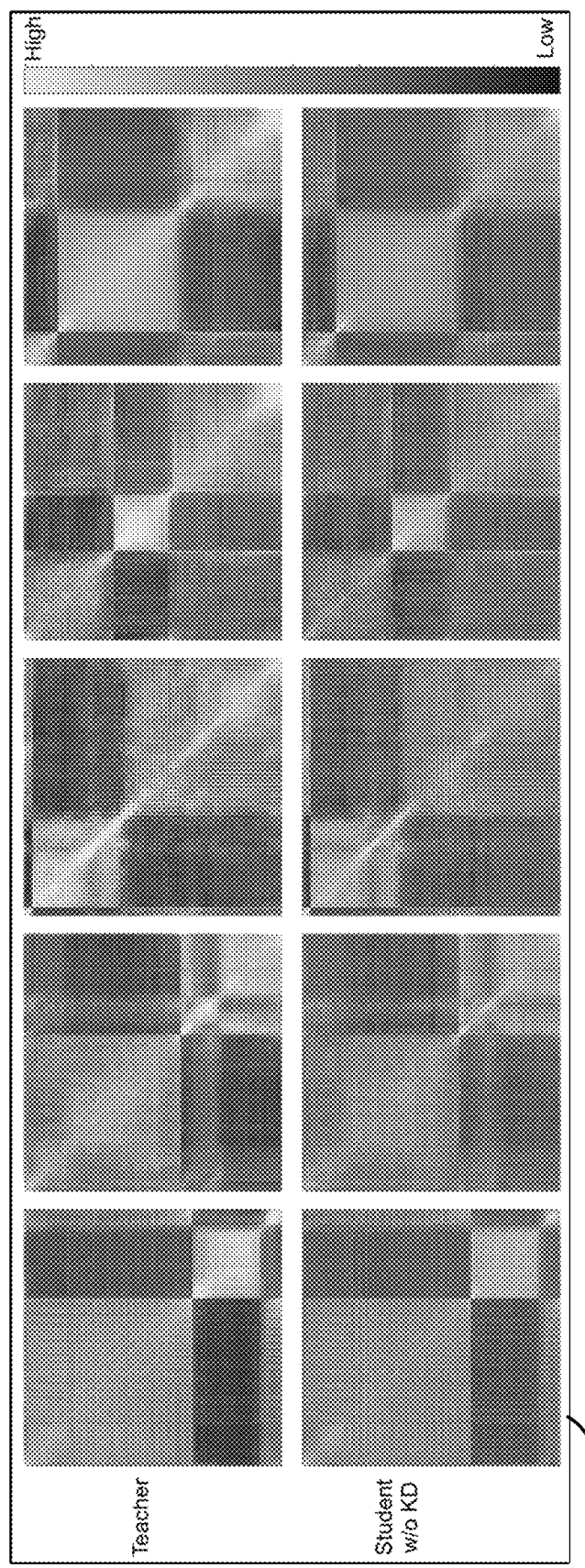
FIG. 3 is a graphical representation of semantic similarity matrix in 5 samples.

We show some evidence to support our intuition of semantic relation activation matrices in FIG. 3. FIG. 3 is an array of graphical representations 300 to enhance the interpretability of the semantic similarity mapping. Pixels are grouped and aligned together based on their semantic class. Brighter colors (lighter tones in greyscale) indicate a higher correlation. The teacher model exhibits similarity for semantic pixels within the same semantic class (diagonal block matrices) and dissimilarity across different semantic classes (o-diagonal block matrices). This matches with our hypothesis, where the teacher model displays clearer semantic relationship than the student model. With respect to FIG. 3, we sample 5 horse and zebra images from COCO dataset

[18] which provide ground truth segmentation masks, and generate all corresponding teacher's and student's activation matrices $\mathcal{A}$ by equation 7. We group the values by pixels of the same semantic class to clearly show different activation patterns. The clear blockwise patterns in the teacher model indicate that pixels of the same semantic class are much more similar compared to pixels of different classes. On the other hand, this pattern is less observable in the student model learned without distillation. This empirical finding strongly supports our hypothesis that there exists certain relation patterns which can be explicitly transferred from a teacher network to a student network. Secondly, the activation matrix $\mathcal{A}$ is independent of the number of channels in feature $\mathcal{F}$, which avoids the difficulty of introducing a handcrafted feature loss to match $\mathcal{F}_t$ and $\mathcal{F}_s$ in different feature spaces.

We define our semantic preserving distillation loss $\mathcal{L}_{SP}$ (line 220 of FIG. 2) to be the L1 loss between two activation matrices:

$$\mathcal{L}_{SP} = \mathbb{E}_{x \sim \mathcal{P}_{data}(x)}[\|\mathcal{A}_t - \mathcal{A}_s\|_1], \tag{8}$$

In preliminary experiments, we also tried L2 loss in enforcing the matching of two matrices but didn't observe any significant improvement. Our full objective is then, $$\mathcal{L} = \mathcal{L}_{GAN_A} + \mathcal{L}_{GAN_B} + \gamma_1 \cdot \mathcal{L}_{SP_A} + \gamma_2 \cdot \mathcal{L}_{SP_B} + \alpha \mathcal{L}_{cyc}(G_s, F_s, X, Y) + (1-\alpha)\mathcal{L}_{cyc}(G_s, F_s, X_t, Y_t). \tag{9}$$

where A and B indicate the generators of each direction respectively, and $\gamma_1$ and $\gamma_2$ and $\alpha$ are hyper-parameters.

4. Experiments

4.1 Different Image-to-Image Translation Datasets

Setup. To illustrate the effectiveness of our method on GAN compression, we qualitatively and quantitatively evaluated it on 5 benchmark image-to-image translation datasets including horse↔zebra, summer↔winter, apple↔orange, tiger↔leopard and Cityscapes label↔photo.

We followed CycleGAN implementation and setup from the official PyTorch implementation for a fair comparison. (CycleGAN official PyTorch implementation is available from URL: github.com/junyanz/pytorch-CycleGAN-and-pix2pix). Specifically, the teacher generator stacks one 7×7 stride-1 convolutional layer, two 3×3 stride-2 convolutional layers, six or nine residual blocks, two 3×3 stride-2 transposed convolutional layers and one final 7×7 stride-1 convolutional layer sequentially. The student generator has the same architecture as the teacher generator but is narrower for each layer by a factor of 2 or 4 depending on the datasets trained on.

Since the teacher and student generators share the same structure in downsampling and upsampling parts, we use the number of residual blocks and the number of filters in the first convolutional layer to specify the generator architecture. This convention defines both depth and width of the model. Specifically, we used Resnet9, ngf64 and Resnet9, ngf16 (a scaling factor of 4) as our major teacher student model pair for all datasets except horse↔zebra dataset, where Resnet9, ngf32 (a scaling factor of 2) is used for the student model. It will be understood that the "9" in Resnet9 references the residual block count as noted above (6 or 9) and the parameter ngfNN references a setting for a number NN of filters in the first layer of the generator. It is understood that there is a balancing between scaling and performance. Experiments may be undertaken to scale down from the teacher model, monitoring one or more performance measures for the student (e.g. performing a comparison between student and teacher) and to choose a scaling factor that produces a desired student performance measure.

As the Cityscapes dataset is inherently a paired dataset of the street view photo images and their corresponding semantic segmentation labels, we also conducted experiments in a Pix2Pix setting. The Pix2Pix framework is similar to the CycleGAN framework in terms of setup for conducting knowledge distillation. The teacher and the student generators in our Pix2Pix experiments have a UNet structure [15]. The UNet structure has only one degree of freedom for scaling down the model (between teacher and student), which is the width. See too the Supplementary Description.

In both the CycleGAN and Pix2Pix embodiments herein, the discriminator network follows the PatchGAN discriminator [15] structure. For all datasets (respective embodiments), the models were trained and evaluated on images of resolution 256×256.

It will be understood that utilizing an existing teacher model, such as a publicly or privately available model, is not required but is advantageous as such are generally pre-trained for the desired task.

Quantitative Evaluation Metrics. We adopt Frechet Inception Distance (FID) [11] on horse↔zebra, summer↔winter, apple↔orange and tiger↔leopard datasets. FID calculates the Wasserstein-2 distance between feature maps extracted by Inception network from generated and real images. As a distance measure, a lower score is preferred for a higher correlation between synthetic and real images. On Cityscapes label↔photo dataset [6], we use FCN-score following the evaluation method used by Isola et al. [15]. The method uses FCN-8s network, a pre-trained semantic classifier, to score on synthetic photos with standard segmentation evaluation metrics from the Cityscapes benchmark including mean pixel accuracy, mean class accuracy and mean class Intersection over Union (IoU).

Quantitative Comparison. In Table 1, we list our experiments conducted on 4 unpaired datasets trained using CycleGAN. We compare our results with two previous works [27, 21] on pruning and different settings of our design. As a reference to the compression ratio, we show a table of computed model size, the number of parameters, memory usage and the number of FLOPs in Table 2.

TABLE 1

|  | h → z | z → h | s → w | w → s | a → o | o → a | t → l | l → t |
|---|---|---|---|---|---|---|---|---|
| Teacher | 84.01 | 136.85 | 76.99 | 74.39 | 132.37 | 130.72 | 76.68 | 77.60 |
| Student | 94.95 | 141.64 | 76:47 | 74.90 | 132.99 | 137.10 | 93.98 | 89.37 |
| ThiNet [21] | 189.28 | 184.88 | 81.06 | 80.17 | — | — | — | — |
| Co-evolutionary [27] | 96.15 | 157.90 | 79.16 | 78.58 | — | — | — | — |
| Vanilla KD | 106.10 | 144.52 | 80.10 | 79.33 | 127.21 | 135.82 | 82.04 | 87.29 |
| Intermediate KD | 97.20 | 143.43 | 77.75 | 74:67 | 126.90 | 133.16 | 86.82 | 92.99 |
| +SP | 90.65 | 143.03 | 78.75 | 76.21 | 125.90 | 132.83 | 81.53 | 86.52 |
| +2 direction SP | 86:31 | 140:15 | 76.59 | 75.69 | 121:17 | 132.83 | 81:17 | 80:75 |

TABLE 1-continued

| h → z | z → h | s → w | w → s | a → o | o → a | t → l | l → t |
|---|---|---|---|---|---|---|---|

In Table 1, the FID values for references/baselines are shown in the upper rows while values for variations of the instant methods are shown in the lower rows. We conducted experiments on datasets horse-to-zebra (h→z, z→h), summer-to-winter (s→w, w→s), apple-to-orange (a→o, o→a), tiger-to-leopard (t→l, l→t). Lower is better. Both Co-evolutionary [27] and ThiNet [27] apply pruning while Co-evolutionary is specifically designed for compressing Cycle-GAN and ThiNet is a pruning method adapted from the classification task. For a fair comparison to Co-evolutionary and ThiNet, the models compared above have similar model size and computation requirement (see Table 2).

TABLE 2

| Model | Size (MB) | # Params | Memory (MB) | FLOPs |
|---|---|---|---|---|
| ResNet 9blocks, ngf 64 (T) | 44 | 11.38M | 431.61 | 47.22 G |
| ThiNet [21] | 11 (75%↓) | — | — | — |
| Co-evolutionary [27] h ↔ z | 10 (77%↓) | — | — | 13.06 G (72%↓) |
| Co-evolutionary [27] s ↔ w | 7.6 (83%↓) | — | — | 10.99 G (77%↓) |
| Co-evolutionary [27] cityscapes | 12 (73%↓) | — | — | 16.45 G (65%↓) |
| ResNet 9blocks, ngf 32 (S1) | 11 (75%↓) | 2.85M (75%↓) | 216.95 (50%↓) | 12.14 G (74%↓) |
| ResNet 9blocks, ngf 16 (S2) | 2.8 (94%↓) | 0.72M (94%↓) | 109.62 (75%↓) | 3.20 G (93%↓) |

In Table 2, there are shown computation and storage results for models on major experiments where T is teacher and S1, S2 are respective student references. Our models achieve superior performance in all tasks with a smaller/similar model size and computation compared to Co-evolutionary and ThiNet. We choose S1 on h↔z and S2 on the rest of the datasets. The choice is made based on the gap between teacher and student baseline performance.

We explore variations of our methods on CycleGAN by conducting the following experiments: 1) We introduce an intermediate distillation loss on the fake image generated by the first generator in the cycle, computing an L1 norm difference between the teacher's generated image and the students. We note this as intermediate KD. 2) We experiment with semantic relation preserving loss in two parts of the cycle. "Semantic Preserving (SP)" indicates that we only apply the semantic distillation loss on the first generator of the cycle (i.e. $\gamma_2=0$ in equation (9)). "2 direction SP" denotes that we applied the semantic distillation loss on both generators in the cycle. '+' means it was added in addition to Vanilla KD.

Though all compared models reach a similar performance on the s↔w dataset, our method accomplishes critically better performance than other methods on the rest of the datasets. Adding our proposed distillation losses on both generators boosts the performance significantly from vanilla knowledge distillation, with the possibility to outperform the original teacher model on some tasks. We will further demonstrate visual evidence in later discussions. On the summer-to-winter task (s↔w), however, we do not observe performance gain and we suspect the reason is that the baseline student model barely differs from the teacher model numerically. There is limited space and knowledge for improvement to take place. Additionally, we run experiments on Cityscapes dataset and show FCN-score in Table 3. Interestingly, we notice a dramatic increase on FCN-score in applying the proposed method but only a similar or slightly better quality of image compared to the original model is observed (See Supplementary). We think our proposed semantic preserving loss strongly reacts to this semantic segmentation dataset, by making pixels more recognizable in a semantic way.

TABLE 3

|  | Mean Pixel Acc. | Mean Class Acc. | Mean Class IoU |
|---|---|---|---|
| Teacher | 0.592 | 0.179 | 0.138 |

TABLE 3-continued

|  | Mean Pixel Acc. | Mean Class Acc. | Mean Class IoU |
|---|---|---|---|
| Student | 0.584 | 0.182 | 0.129 |
| ThiNet [21] | 0.218 | 0.089 | 0.054 |
| Co-evolutionary [27] | 0.542 | 0:212 | 0.131 |
| Ours | 0:704 | 0.205 | 0:154 |

Qualitative Results.

Figure 4:
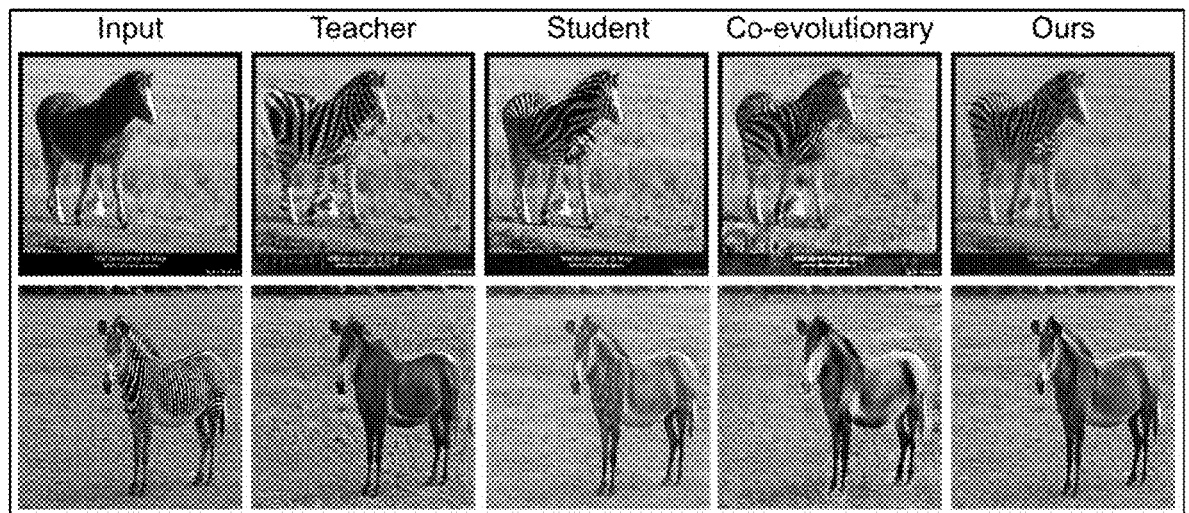
FIG. 4 is an array of images for the horse H zebra task to contrast output of a teacher model, a student model, a prior model and a present model in accordance with the present disclosure using selected input examples.

In this section, we present visual observations on the generated images from our models and reference models. To compare our results to [27], we also generated images using our models on their selected input images displayed in FIG. 4. Thus FIG. 4 is an array of images 400 to contrast output of a teacher model, a prior model according to [27] and a present model in accordance with the present disclosure. The top row displays an input horse image and generated zebra images using the respective models. The bottom row displays an input zebra image and generated horse images using the respective models. Evidently, generated images using the present model (right most column in FIG. 4) contain a more realistic horse/zebra and reduce the artifacts to a minimum in the background.

In the earlier discussion, we mention the potential of the student model to outperform the teacher by adding our proposed semantic preserving loss, with the numerical evidence in Table 1. The extra guidance signal from the teacher's pairwise semantic preserving activations not only encourages the student to learn more intra-pixel relationships within a specific image but also semantic understanding of the entire training population. Furthermore, this method accelerates the learning of discriminators towards catching more details in the early stage. Incorporating both effects empowers the student model to even outperform the teacher model in certain cases.

Figure 5:
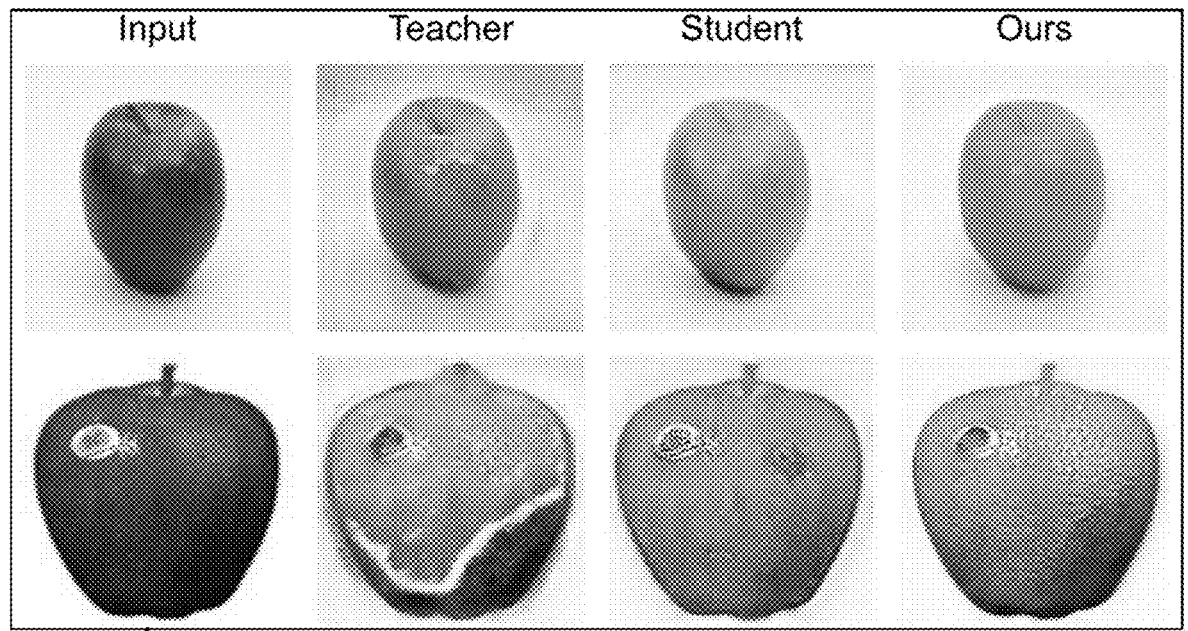
FIG. 5 is an array of images for the apple H orange task to contrast output of a teacher model, a student model, a prior model and a present model in accordance with the present disclosure using selected input examples.

FIG. 5 is an array of images 500 to contrast output. In FIG. 5, we show 2 significant examples of the apple↔orange task where our proposed method achieves exceptionally better results. Clear and realistic texture is generated using our method, even outperforming the teacher.

Figure 6:
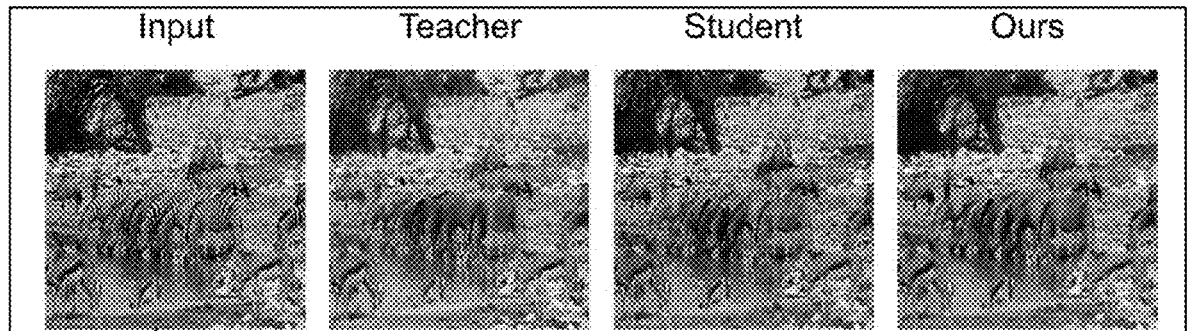
FIG. 6 is a row of images for the horse H zebra task to contrast output of a teacher model, a student model, a prior model and a present model in accordance with the present disclosure using a selected input example representing a common failure example.

FIG. 6 is an array of images 600 to contrast output. An intriguing example we show in FIG. 6 is from a common failure case of CycleGAN, where it has multiple objects to be transferred. Our method, however, makes a noticeable improvement in translating more objects in the generated image—more zebras are modified as horses. Another interesting finding of our proposed method is that we observe significantly better details and textures preserving in different tasks.

Figure 7:
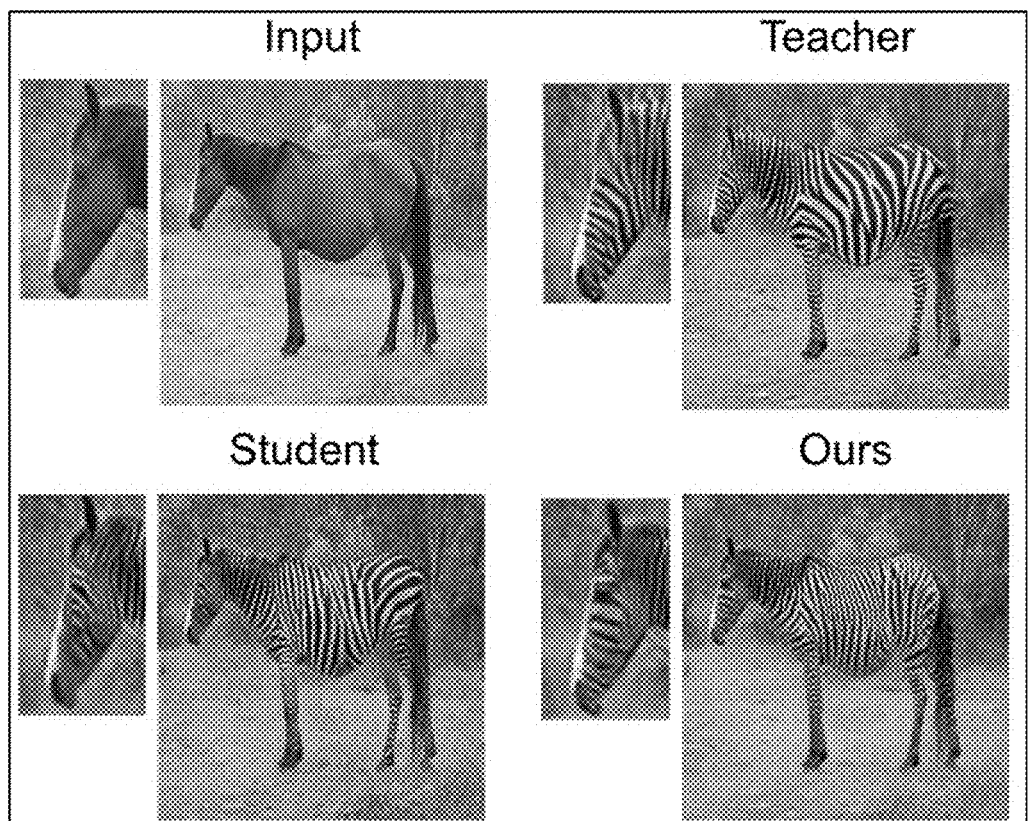
FIG. 7 is an array of images for the horse H zebra task to contrast output of a teacher model, a student model, a prior model and a present model in accordance with the present disclosure using one example input. The array includes pairings of a respective image and an enlarged portion thereof showing detail.
Figure 8:
FIG. 8. is an array of images for 4 different datasets showing an ablation study to contrast output of baseline models and present models according to one or more embodiments

FIG. 7 is an array of images 700 including enlarged portions to contrast output. In FIG. 7, a more detailed and realistic eye is preserved from input horse image to generated zebra image. We also provide examples in an array of images 800 from different datasets in FIG. 8 in an ablation study manner. Examples from multiple datasets compare results in baseline models and variation of our methods.

4.2 Different Architectures

We also demonstrate evidence that our method is extensible to other types of network structure. On the horse-to-zebra task, we replace the Resnet9 to Resnet6 generator for both the teacher and the student models. The FID evaluation is shown in Table 4 where FID values for Resnet6 generators on Horse↔Zebra dataset are set out. Our method still has the most improvement over others but not as significant as in the Resnet9 case. We conjecture that cutting down 3 residual blocks from the encoder hurts the expressive power of the teacher model to extract more semantic relationships, which limits the amount of knowledge to be conveyed in the training process. We also conducted additional experiments on paired data using UNet [15]. This is done on the Cityscapes dataset mapping from semantic labels to street view photos. The UNet generator yields an encoder-decoder structure, which encodes the input through 8 4×4 stride-2 convolutional layers and decodes through 8 4×4 stride-2 transposed convolutional layers. Skip-connections are utilized in a regular UNet fashion.

TABLE 4

| | Teacher | Student | Intermediate KD | Vanilla KD | +SP | +2 direction SP |
|---|---|---|---|---|---|---|
| h → z | 88.27 | 109.93 | 107.04 | 105.49 | 108.71 | 105.51 |
| z → h | 143.08 | 144.01 | 142.63 | 146.26 | 141.50 | 141.90 |

TABLE 5

| | Mean Pixel Acc. | Mean Class Acc. | Mean Class IoU |
|---|---|---|---|
| Teacher | 0.757 | 0.235 | 0.191 |
| Student | 0.710 | 0.219 | 0.169 |
| Vanilla KD | 0.742 | 0.224 | 0.182 |
| +SP layer 2 | 0.743 | 0:230 | 0.183 |
| +SP layer 3 | 0:770 | 0.229 | 0.183 |

For Resnet generators, the teacher's encoding output from a bottleneck layer with a 64×64 spatial resolution is distilled to guide the students training. Since UNet's encoder downsamples the input to 1×1 spatial resolution at the bottleneck layer, the desired spatial semantic information is lacking at the bottleneck layer. Therefore, we chose to distill the semantic relation activation matrix at layer 2 and layer 3, which have a 64×64 spatial dimension and 32×32 spatial, respectively. We show FCN-score results in Table 5 where FCN-score results for different models on the Cityscapes dataset through Pix2Pix training is set out. Feature encoding extracted from layer 2 of UNet256 has a 64×64 spatial resolution, from layer 3 has a 32×32 spatial resolution.

In an embodiment, the highest mean pixel accuracy with distilling is found at layer 3 but similar results for mean class IoU at both layers. Detailed model compression ratio and visual results can be found in the Supplementary Description.

5. Supplementary Description 5.1 Knowledge Distillation Objective Function for Pix2Pix Experiment Vanilla Knowledge Distillation. The CycleGAN framework involves two generators and a cycle consistency loss given then task. The Pix2Pix framework only translates in one direction with translation trained with paired data in a supervised way. By analogy to how vanilla knowledge distillation is applied on a classification task, the objective function in the Pix2Pix framework has the following form:

$$\mathcal{L}_{(G_s,D)} = \lambda(\alpha \cdot \mathcal{L}_{L1}(G_s,X,Y) + (1-\alpha) \cdot \mathcal{L}_{L1}(G_s,X,Y_t)) + \mathcal{L}_{GAN}(G_s,D,X,Y), \quad (10)$$

where $\mathcal{L}_{L1}$ is an L1 norm loss between the ground-truth labels and the generated images, $\lambda$ is the balancing coefficient for $\mathcal{L}_{L1}$, and $\alpha$ is the hyper-parameter to weigh between the true label and the teacher's label.

Semantic Preserving Knowledge Distillation. Built on the vanilla knowledge distillation objective, semantic preserving knowledge distillation loss is directly added to the above objective function:

$$\mathcal{L} = \mathcal{L}_{GAN} + \gamma \cdot \mathcal{L}_{SP} + \lambda(\alpha \cdot \mathcal{L}_{L1}(G_s,X,Y) + (1-\alpha) \cdot \mathcal{L}_{L1}(G_s,X,Y_T)). \quad (11)$$

5.2 Model Size and Computation Results for Pix2Pix Experiment

The teacher and the student models used in Pix2Pix experiments with computation and storage statistics are shown in Table 6. In an embodiment, the choice is made based on the gap between the teacher and the student baseline performance.

TABLE 6

| Model | Size (MB) | # Params | Memory (MB) | FLOPs |
|---|---|---|---|---|
| UNet256, ngf 64 (T) | 208 | 54.41M | 51.16 | 2.03 G |
| UNet256, ngf 16 (S) | 11 (95%↓) | 3.40M (94%↓) | 13.91 (73%↓) | 0.14 G (93%↓) |

5.3 Qualitative Results on Cityscapes

Figure 9:
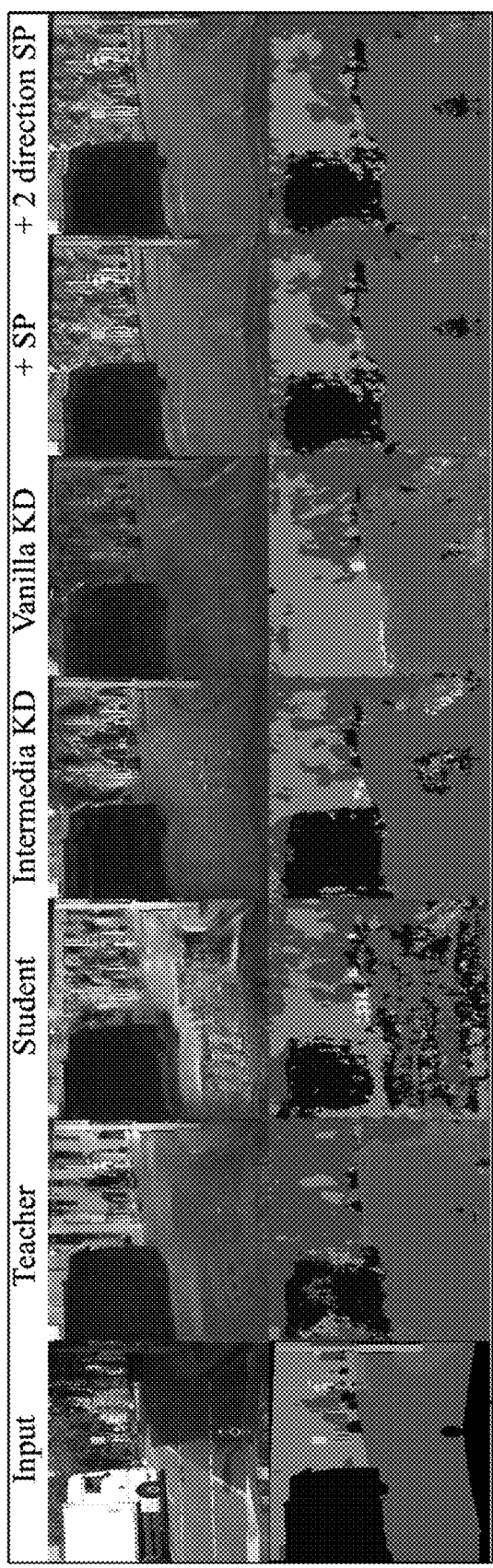
FIGS. 9 and 10 are arrays of images from respective ablation studies in accordance with particular network architecture experiments.
Figure 10:
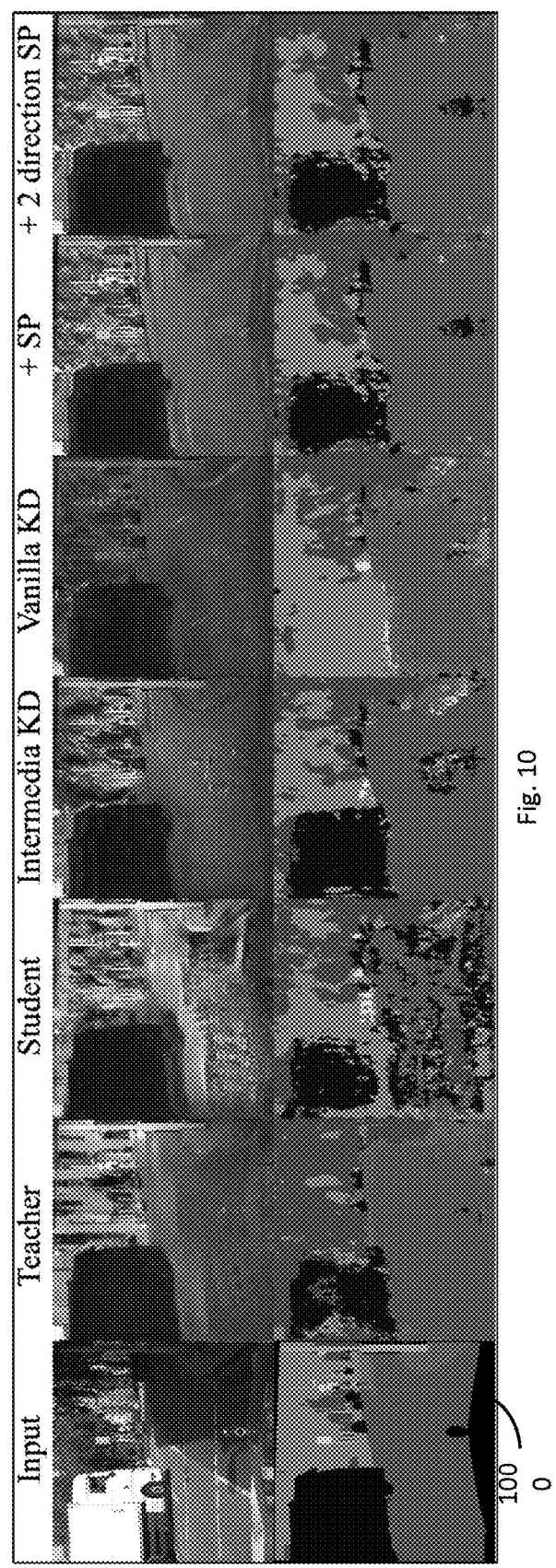

On the Cityscapes dataset, we conducted both paired and unpaired image translation experiments via Pix2Pix and CycleGAN training, respectively. The synthetic street view images translated from their semantic masks along with FCN-8s generated instance segmentation masks are displayed in FIG. 9 and FIG. 10. FIG. 9 is an array of images 900 from an ablation study showing generated street view images with FCN-8s segmented masks through CycleGAN training on the Cityscapes dataset. The image generated by our method (last column) significantly reduces artifacts compared to the student's generated image. Although the teacher generates a more realistic image, we observe that our model preserves pixels' semantic class with respect to the input mask. For example, in the top right corner, the teacher's generated image only includes buildings in the designated region of trees. FIG. 10 is an array of images 1000 from an ablation study showing generated street view images with FCN-8s segmented masks through Pix2Pix training on the Cityscapes dataset. Among all generated masks, our model (last column) shows the most distinct segmentation mask with clear boundaries of each semantic class. For instance, on the right of the segmented masks, we observe a significant improvement at the boundary of the green belt and the side walk.

5.4 Experiment Details

All models are trained on 256×256 input images with a batch size of 1 and optimized using Adam [32], an adaptive learning rate optimization algorithm for training deep neural networks. The other settings for GAN training is the same as CycleGAN and Pix2Pix.

The horse↔zebra, summer↔winter and apple↔orange datasets are down-loaded using the CycleGAN provided script. The horse↔zebra with segmentation mask sample image, which is used to draw semantic similarity matrices is downloaded from COCO [18]. The tiger↔leopard dataset is obtained from ImageNet [7] using keyword tiger and leopard. The Cityscapes dataset is download from the official website (URL: cityscapes-dataset.com).

Implementation of FID score is adapted from a PyTorch port version of its official implementation (URL: github-.com/mseitzer/pytorch-fid). Calculation of FCN-score is provided in Pix2Pix official Torch implementation (URL: github.com/phillipi/pix2pix).

In the vanilla knowledge distillation training, we set $\lambda=10$ and $\alpha=0.05$ for all experiments. $\gamma$ ($\gamma1=\gamma2$) is set to 0.9 in horse↔zebra, 0.5 in summer↔winter, 0.8 in apple↔orange, 0.2 in tiger↔leopard and 0.2 in Cityscapes for the unpaired translation experiments. In the paired translation experiments, $\gamma$ is set to 1 and $\lambda$ is set to 100.

6. Application(s)

In respective embodiments, GANs-based models having generators for image-to-image translation to provide any of collection style transfer, object transfiguration, season transfer, photo enhancement or other image processing effects. As an example, makeup, hair, nail or other effects are applied to a source image, translating the source image from a first domain space (e.g. where the desired effect is absent) to a second domain space having the desired effect. An image to image translation is enabled simulate other effects, such as through appropriate training. In an embodiment, such effects are applied to (human) skin and/or hair. In an example, an age simulation effect is applied, such as to simulate an age effect on a facial image of a person.

In an embodiment, models having generators for image-to-image translation are incorporated into a computer implemented method (e.g. an application) or computing device or system to provide a virtual reality, augmented reality and/or modified reality experience. In an embodiment, a user is enabled to use a camera equipped smartphone or tablet, etc. and take a selfie image (or video) and a generator, in real time, apply the desired effect such as for playback or other presenting by the smartphone or tablet.

A model having a generator that is compressed in accordance with the teaching herein is loadable and executable on commonly available consumer smartphones or tablets (e.g. target devices). Experiments were conducted using a device a hardware specification: Intel® Xeon® CPU E5-2686 v4 @ 2.30 GHz, profiled with only 1 core and 1 thread. As noted, the teacher model was defined with Resnet9 and ngf64 as a baseline. The new student model was defined with Resnet9 and ngf16. The teacher model size was 44 MB and the student 2.8 MB. The inference time for the teacher was 2.69 seconds and 0.43 seconds for the student. More comparative results are found at Table 2.

An example of the use of GANS is shown and described in Applicant's U.S. patent application Ser. No. 16/683,398, filed Nov. 14, 2019 and entitled "System and Method for Augmented Reality by translating an image using Conditional cycle-consistent Generative Adversarial Networks (ccGans)", which is incorporated herein by reference.

In an embodiment, disclosed technologies and methodologies include developer related methods and systems to define (such as through conditioning) a student model having a generator for image to image translation that maintains pixel-wise semantic knowledge determined by a teacher model configured for the same task. The student model is a compressed form of the teacher model, reducing parameters, footprint and inference time execution in relation to the teacher model. User related methods and systems are also shown such as where the student model (e.g. generator) is used at a run-time to process an image for image to image translation.

In an embodiment, an addition to developer (e.g. used at training time) and target (used at inference time) computing device aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects disclosed herein. Also shown and described are e-commerce system related aspects. A user's computing device, in an embodiment, is configured as a client computing device in relation to the e-commerce system, The e-commerce system, for example, stores a computer program for such a client computing device. Thus the e-commerce system has as a component thereof a computer program product, which product stores instructions which when executed by (e.g. a processing unit of) the client computing device configures such a client computing device. These and other aspects will be apparent.

Figure 11:
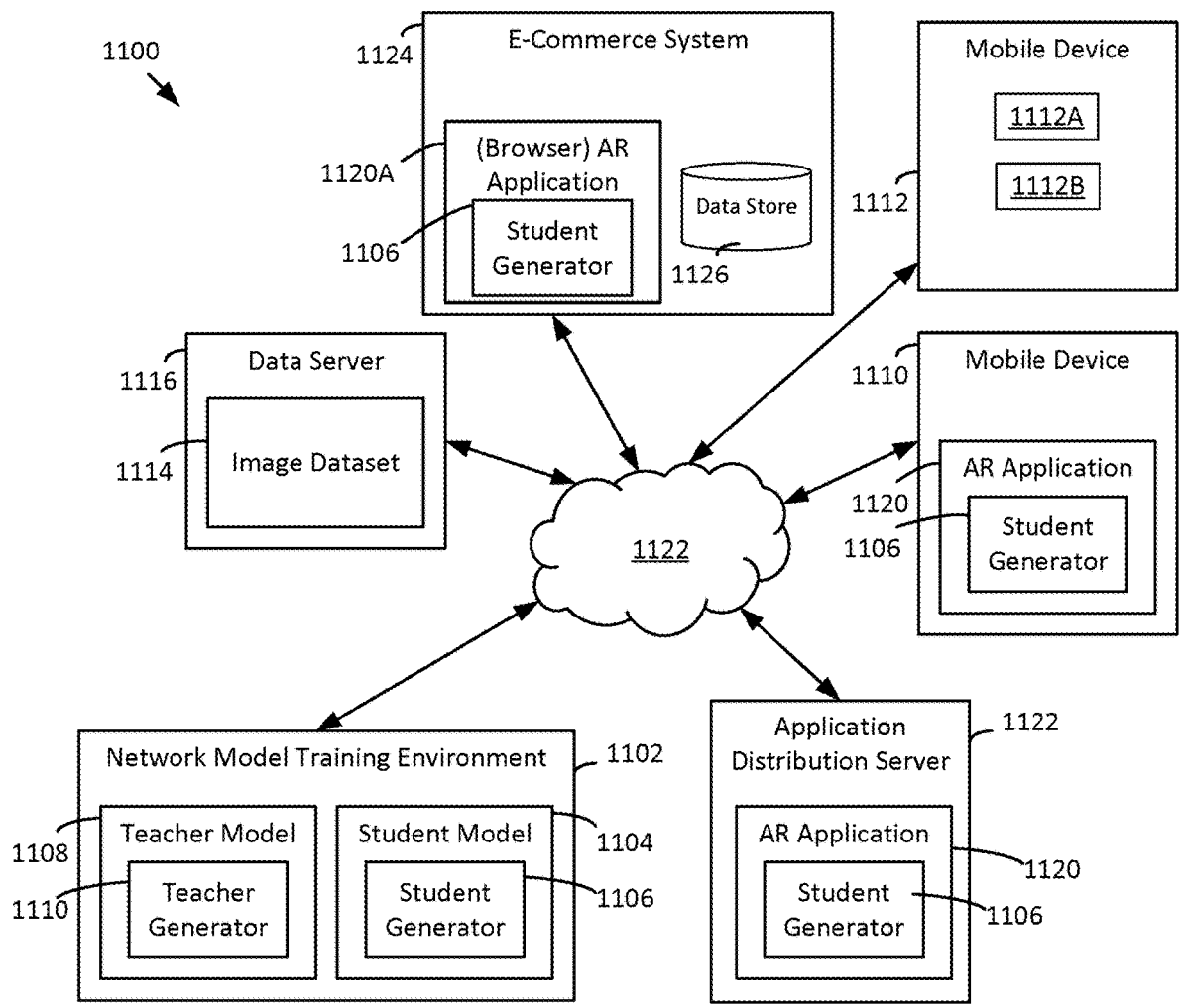
FIG. 11 is a block diagram of a computer system according to an embodiment.

FIG. 11 is a block diagram of a computer system 1100. In an embodiment, computer system 1100 comprises a plurality of computing devices which, in an embodiment, includes servers, developer computers (PCs, laptops, etc.) and mobile devices such as smartphones and tablets, etc. There is shown a network model training environment 1102 comprising hardware and software to define and configure, such as through conditioning, a GANs-based student model 1104 having a student generator 1106 (generator $G_S$). The student model 1104 (and student generator 1106) are conditioned using knowledge distillation techniques via a GANs-based teacher model 1108 having a teacher generator 1110 (generator $G_T$). The teacher model (and student model) are configured for an image processing task such as image to image translation.

In an embodiment, the conditioning transfers semantic knowledge developed for the teacher model 1108 to the student model 1104 using a semantic knowledge preservation loss (a form of distillation loss is added to a traditional distillation loss between teacher and student output (images)). Semantic knowledge, developed in an intermediate layer of the teacher model 1108 (e.g. generator $G_T$) is transferred to an intermediate layer using the semantic knowledge preservation loss. The teacher model and the student model are defined in accordance with a common network architecture. The student model is scaled downwardly in relation to the teacher model for example, to reduce a size and/or processing resource requirements to enable use of the generator on a target device such as one of the mobile devices 1110, 1112 (such as 1110) of the system 1100.

In an embodiment, network model training environment 1102 employs a teacher model that is pre-trained for the image task. The teacher model 1108 is pre-trained such as by using an image dataset 1114 stored at a data server 1116. In an embodiment, the teacher model 1108 is a model developed "in-house". In an embodiment, the teacher model 1108 is publicly available such as via an open source license. The dataset can be similarly developed and available. Depending on the type of image task and network architecture (e.g. supervised), the training is supervised and the dataset annotated according for such training. In other scenarios, the training is unsupervised and the data defined accordingly.

In an embodiment, the student generator 1106 generates or is incorporated into an augmented reality (AR) application 1120. Though not shown, in an embodiment, the application is developed using an application developer computing device for particular target devices having particular hardware and software, particularly operating system configuration. In an embodiment, the AR application 1120 is a native application configured for execution in a specific native environment such as one defined for a particular operating system (and/or hardware). In an embodiment, the AR application 1120 takes the form of a browser-based application, for example, configured to execute in a browser environment of the target device.

In an embodiment, the AR application 1120 is distributed (e.g. downloaded) by user devices such as mobile devices 1110 and 1112. Native applications are often distributed through an application distribution server 1122 (e.g. a "Store" operated by a third party service), though this is not necessary.

In an embodiment, the AR application 1120 is configured to provide an augmented reality experience (for example via an interface) to a user. For example, an effect is provided to an image via processing by the student generator 1106. The mobile device comprises a camera (not shown) to capture an image (e.g. a still or video image, whether a selfie image or not). The effect is applied to the image, for example, to the video image, in a real-time manner (and displayed on a display device of the mobile device) to simulate an effect on a user as the video is captured. As the position of the camera is changed, the effect is applied in response to the image(s) of the video as captured to simulate the augmented reality.

In an embodiment, the computing devices are coupled for communication via one or more networks (e.g. 1122), which comprise wireless networks or otherwise, public networks or otherwise, etc.

By way of example, but without limitation, an e-commerce system 1124 is web-based and provides a browser-based AR application 1120A as a component of an e-commerce service provided by the e-commerce system 1124. E-commerce system 1124 comprises a configured computing device and a data store 1126 (e.g. a database or other configuration). Data store 1126 stores data about products, services, and related information (e.g. techniques for applying a product). Data store 1126 or other data storage devices (not shown) stores recommendation rules or other forms of product and/or service recommendations, etc. to assist a user to choose among available products and services. The products and services are presented via a user-experience interface displayed on a user's (mobile) computing device. It will be appreciated that the e-commerce system 1124 is simplified.

In an embodiment, browser-based AR application 1120A (or AR application 1120) provides an augmented reality customer experience such as to simulate a product, technique or service provided or facilitated by the e-commerce system 1124. It will be understood that AR application 1120, in the embodiment, is also configured to provide e-commerce services such as via a connection to e-commerce service 1124.

By way of example, but without limitation, a product comprises a cosmetic (e.g. makeup) product, an anti-aging or rejuvenation product, and a service comprises a cosmetic, an anti-aging or a rejuvenation service. A service comprises a treatment or other procedure. The product or service relates to a portion of a human body such as a face, hair or nails. In an embodiment, a computing device (such as mobile device 1112) so configured thus provides a face-effect unit 1112A including processing circuitry configured to apply at least one facial effect to the source image and to generate one or more virtual instances of an applied-effect source image (e.g. displayed) on an e-commerce interface of the computing device that is facilitated by the e-commerce system. In an embodiment, the face-effect unit 112A utilizes the generative adversarial network (GAN)-based student generator ($G_S$) such as is described herein to produce the applied-effect source image. In an embodiment, the computing device provides a user-experience unit 112B including processing circuitry to determine at least one product or service from the data store 1126 and to generate one or more virtual instances of a recommendation on an e-commerce interface to purchase products or services. In an embodiment, the at least one product is associated with a respective facial effect and the face-effect unit applies the respective facial effect to provide a virtual try on experience.

In an embodiment, the user experience unit 112B is configured to present a graphical user interface (e.g. browser based or otherwise) to work with the computing device 1112 and the e-commerce system 1124. In an embodiment, the e-commerce system 1124 is thus configured to provide the AR application for execution by client computing devices such as a mobile device (e.g. 1112) and is cooperatively configured to provide e-commerce services to the client computing device to facilitate (product/service) recommendations for AR simulation via the client computing device (e.g. 1112) and facilitate purchases.

Thus, any of the computing devices, but particularly the mobile devices, provide a computing device to translate an image from a first domain space to a second domain space. The computing device comprises a storage unit storing a generative adversarial network (GAN)-based student generator ($G_S$), configured to translate images from the first domain space to the second domain space, the generator $G_S$ scaled downwardly in relation to a GANs-based teacher generator ($G_T$) also configured to translate images from the first domain space to the second domain space. In an embodiment, the generator $G_S$ comprises a configuration (e.g. that is conditioned) to maintain a semantic relation knowledge determined for the generator $G_T$. In an embodiment, the computing device comprises a processing unit configured to (e.g. via the AR application 1120): receive the image; provide the image to the generator $G_S$ to obtain a translated image; and provide the translated image for presenting.

The generator $G_S$ configuration is conditioned using a semantic relation knowledge distillation loss in relation to the generator $G_T$ to transfer the semantic relation knowledge determined for the generator $G_T$ to the generator $G_S$. The generator $G_S$ and the generator $G_T$ are defined in accordance with a common network architecture. The generator $G_S$ is scaled downwardly in terms of width, depth or both width and depth relative to the generator $G_T$, wherein width means a number of filters in each layer and depth means a number of residual blocks in the common network architecture.

In an embodiment, the processing unit is configured to provide the translated image in an augmented reality interface to simulate an effect applied to the image. In an embodiment, the effect comprises any of a makeup effect, a hair effect, a nail effect, and an age simulation effect applied to the image. For example, the image comprises an applicable portion (e.g. face, hair, nails or body portion) of a subject such as a user of the device.

In an embodiment, the semantic relation knowledge is transferred from an intermediate layer of the generator $G_T$ to an intermediate layer of the generator $G_S$.

In an embodiment, the generator $G_S$ configuration is conditioned such that:
a. in each of the generator $G_S$ and the generator $G_T$, at a respective intermediate layer during conditioning, semantic relations are represented by similarity matrices defined by calculating pairwise activation similarities on pixels of a respective feature encoding performed by the generator $G_S$ and the generator $G_T$; and
b. the knowledge is transferred via the semantic relation knowledge distillation loss on the similarity matrices.

In an embodiment, the generator $G_S$ configuration is conditioned by adding the semantic relation knowledge distillation loss in addition to a traditional distillation loss on final generated images of the generator $G_S$ and the generator $G_T$. A respective semantic relation activation matrix is calculated as an outer product of the respective feature encoding and the semantic relation knowledge distillation loss compares the respective semantic relation activation matrices of the generator $G_S$ and the generator $G_T$. In an embodiment, the computing device such as mobile device 1110 is configured to perform a method in accordance with the computing device aspect thus described. Other aspects will be apparent such as computer program product aspects.

Figure 12:
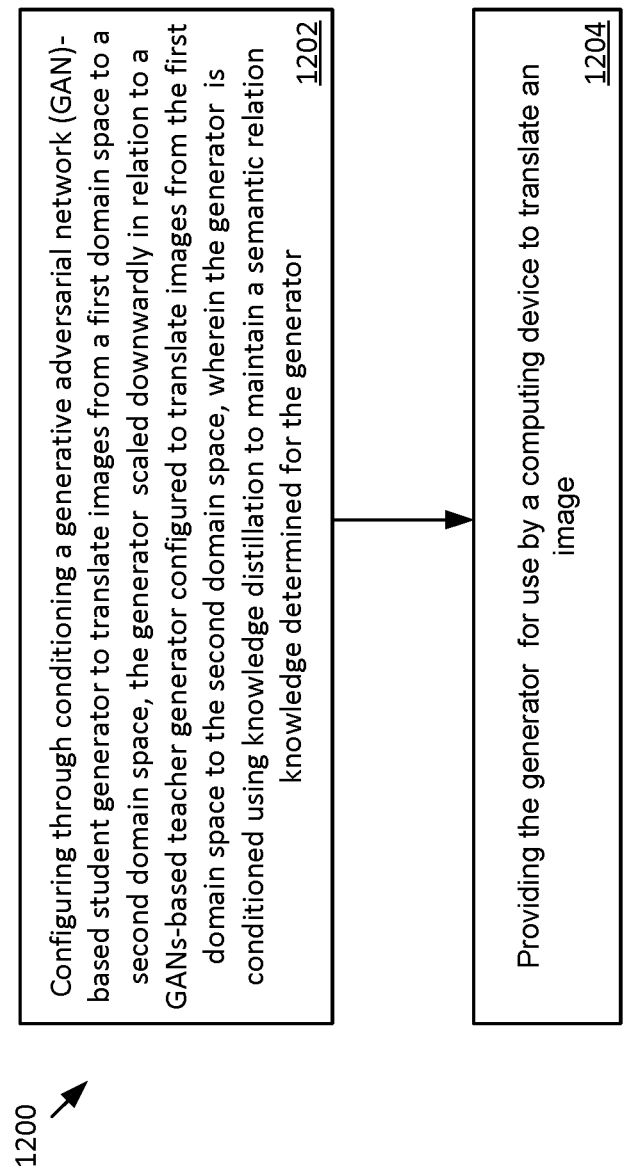
FIG. 12 is a flow chart showing operations in accordance with an embedment herein.

The network model training environment 1102 provides a computing device configured to perform a method such as a method to configure by conditioning a GANs-based student generator. It will be understood that embodiments of the computing device aspect of the network model training environment 1102 and any related embodiments of, for example, the student generator or model, apply to the training method aspect, with suitable adaptation. FIG. 12 showing a flow chart of operations 1200 in accordance with an embedment herein. The operations provide a method such as for training (e.g through condition) in an embodiment. At step 1202, operations configure through conditioning a generative adversarial network (GAN)-based student generator ($G_S$) to translate images from a first domain space to a second domain space, the generator $G_S$ scaled downwardly in relation to a GANs-based teacher generator ($G_T$) configured to translate images from the first domain space to the second domain space, wherein the generator $G_S$ is conditioned using knowledge distillation to maintain a semantic relation knowledge determined for the generator $G_T$. At step 1204, operations provide the generator $G_S$ for use by a computing device to translate an image. A related computed device and computer program product aspect will be apparent as will other aspects.

7. Conclusions

There is described, in various embodiments, model compression of GANs via methods, systems and techniques that extend on traditional knowledge distillation. Semantic relation knowledge is transferred from a teacher model to a selected student model, which student model generates images with better details and texture after explicitly leaning the relationships among pixels while using knowledge distillation to significantly reduce the model size and computation requirement. Through experiments conducted on 5 different datasets and 3 different architectures (e.g. embodiments), it is demonstrated quantitatively and qualitatively that the proposed methods, systems and techniques helps bring a previously incompetent student network to the level of its teacher, with the capability to generate images at a significantly higher level of quality. In addition, applying the knowledge distillation based methods, systems and techniques releases the burden of controlling pruning ratio and carefully structuring the pruned model, which also provides more freedom in model choice.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES

1. Brock, A., Donahue, J., Simonyan, K.: Large scale GAN training for high fidelity natural image synthesis. In: International Conference on Learning Representations (2019)

2. Chen, G., Choi, W., Yu, X., Han, T., Chandraker, M.: Learning efficient object detection models with knowledge distillation. In: Guyon, I., Luxburg, U. V., Bengio, S., Wallach, H., Fergus, R., Vishwanathan, S., Garnett, R. (eds.) Advances in Neural Information Processing Systems 30, pp. 742-751. Curran Associates, Inc. (2017), URL: papers.nips.cc/paper/6676-learning-efficient-object-detection-models-with-knowledge-distillation.pdf
3. Chen, Y., Yang, T., Zhang, X., Meng, G., Pan, C., Sun, J.: Detnas: Backbone search for object detection (2019)
4. Chen, Y., Wang, N., Zhang, Z.: Darkrank: Accelerating deep metric learning via cross sample similarities transfer. In: Thirty-Second AAA Conference on Artificial Intelligence (2018)
5. Choi, Y., Choi, M., Kim, M., Ha, J. W., Kim, S., Choo, J.: Stargan: Unified generative adversarial networks for multi-domain image-to-image translation. In: Proceedings of the IEEE conference on computer vision and pattern recognition. pp. 8789-8797 (2018)
6. Cordts, M., Omran, M., Ramos, S., Rehfeld, T., Enzweiler, M., Benenson, R., Franke, U., Roth, S., Schiele, B.: The cityscapes dataset for semantic urban scene understanding. In: Proceedings of the IEEE conference on computer vision and pattern recognition. pp. 3213-3223 (2016)
7. Deng, J., Dong, W., Socher, R., Li, L. J., Li, K., Fei-Fei, L.: Imagenet: A large-scale hierarchical image database. In: 2009 IEEE conference on computer vision and pattern recognition. pp. 248-255. Ieee (2009)
8. Goodfellow, I., Pouget-Abadie, J., Mirza, M., Xu, B., Warde-Farley, D., Ozair, S., Courville, A., Bengio, Y: Generative adversarial nets. In: Advances in neural information processing systems. pp. 2672-2680 (2014)
9. Han, S., Mao, H., Daily, W. J.: Deep compression: Compressing deep neural network with pruning, trained quantization and human coding. In: Bengio, Y., Le-Cun, Y. (eds.) 4th International Conference on Learning Representations, ICLR 2016, San Juan, Puerto Rico, May 2-4, 2016, Conference Track Proceedings (2016), URL: arxiv.org/abs/1510.00149
10. He, Y., Lin, J., Liu, Z., Wang, H., Li, L. J., Han, S.: Amc: Automl for model compression and acceleration on mobile devices. In: Proceedings of the European Conference on Computer Vision (ECCV). pp. 784-800 (2018)
11. Heusel, M., Ramsauer, H., Unterthiner, T., Nessler, B., Hochreiter, S.: Gans trained by a two time-scale update rule converge to a local nash equilibrium. In: Advances in neural information processing systems. pp. 6626-6637 (2017)
12. Hinton, G., Vinyals, O., Dean, J.: Distilling the knowledge in a neural network. arXiv preprint arXiv: 1503.02531 (2015)
13. Howard, A., Sandler, M., Chu, G., Chen, L. C., Chen, B., Tan, M., Wang, W., Zhu, Y., Pang, R., Vasudevan, V., et al.: Searching for mobilenetv3. In: Proceedings of the IEEE International Conference on Computer Vision. pp. 1314-1324 (2019)
14. Howard, A. G., Zhu, M., Chen, B., Kalenichenko, D., Wang, W., Weyand, T., Andreetto, M., Adam, H.: Mobilenets: Efficient convolutional neural networks for mobile vision applications. arXiv preprint arXiv:1704.04861 (2017)
15. Isola, P., Zhu, J. Y., Zhou, T., Efros, A. A.: Image-to-image translation with conditional adversarial networks. In: Proceedings of the IEEE conference on computer vision and pattern recognition. pp. 1125-1134 (2017)
16. Krizhevsky, A., Sutskever, I., Hinton, G. E.: Imagenet classification with deep convolutional neural networks. In: Advances in neural information processing systems. pp. 1097-1105 (2012)
17. Ledig, C., Theis, L., Huszar, F., Caballero, J., Cunningham, A., Acosta, A., Aitken, A., Tejani, A., Totz, J., Wang, Z., et al.: Photo-realistic single image super-resolution using a generative adversarial network. In: Proceedings of the IEEE conference on computer vision and pattern recognition. pp. 4681-4690 (2017)
18. Lin, T., Maire, M., Belongie, S. J., Hays, J., Perona, P., Ramanan, D., Dollar, P., Zitnick, C. L.: Microsoft COCO: common objects in context. In: Fleet, D. J., Pajdla, T., Schiele, B., Tuytelaars, T. (eds.) Computer Vision—ECCV 2014-13th European Conference, Zurich, Switzerland, Sep. 6-12, 2014, Proceedings, Part V. Lecture Notes in Computer Science, vol. 8693, pp. 740-755. Springer (2014). URL: doi.org/10.1007/978-3-319-10602-1_48
19. Liu, C., Chen, L. C., Schroff, F., Adam, H., Hua, W., Yuille, A. L., Fei-Fei, L.: Auto-deeplab: Hierarchical neural architecture search for semantic image segmentation. In: The IEEE Conference on Computer Vision and Pattern Recognition (CVPR) (June 2019)
20. Liu, Y., Chen, K., Liu, C., Qin, Z., Luo, Z., Wang, J.: Structured knowledge distillation for semantic segmentation. In: Proceedings of the IEEE Conference on Computer Vision and Pattern Recognition. pp. 2604-2613 (2019)
21. Luo, J. H., Wu, J., Lin, W.: Thinet: A filter level pruning method for deep neural network compression. In: Proceedings of the IEEE international conference on computer vision. pp. 5058-5066 (2017)
22. Park, W., Kim, D., Lu, Y., Cho, M.: Relational knowledge distillation. In: Proceedings of the IEEE Conference on Computer Vision and Pattern Recognition. pp. 3967-3976 (2019)
23. Peng, B., Jin, X., Liu, J., Li, D., Wu, Y., Liu, Y., Zhou, S., Zhang, Z.: Correlation congruence for knowledge distillation. In: Proceedings of the IEEE International Conference on Computer Vision. pp. 5007-5016 (2019)
24. Redmon, J., Farhadi, A.: Yolov3: An incremental improvement. arXiv preprint arXiv:1804.02767 (2018)
25. Sandler, M., Howard, A., Zhu, M., Zhmoginov, A., Chen, L. C.: Mobilenetv2: Inverted residuals and linear bottlenecks. In: Proceedings of the IEEE conference on computer vision and pattern recognition. pp. 4510-4520 (2018)
26. Shaham, T. R., Dekel, T., Michaeli, T.: Singan: Learning a generative model from a single natural image. In: Proceedings of the IEEE International Conference on Computer Vision. pp. 4570-4580 (2019)
27. Shu, H., Wang, Y., Jia, X., Han, K., Chen, H., Xu, C., Tian, Q., Xu, C.: Co-evolutionary compression for unpaired image translation. In: Proceedings of the IEEE International Conference on Computer Vision. pp. 3235-3244 (2019)
28. Simonyan, K., Zisserman, A.: Very deep convolutional networks for large-scale image recognition. In: International Conference on Learning Representations (2015)
29. Tung, F., Mori, G.: Similarity-preserving knowledge distillation. In: Proceedings of the IEEE International Conference on Computer Vision. pp. 1365-1374 (2019)
30. Zagoruyko, S., Komodakis, N.: Paying more attention to attention: Improving the performance of convolutional neural networks via attention transfer. arXiv preprint arXiv:1612.03928 (2016)

31. Zhu, J. Y., Park, T., Isola, P., Efros, A. A.: Unpaired image-to-image translation using cycle-consistent adversarial networks. In: Proceedings of the IEEE international conference on computer vision. pp. 2223-2232 (2017)
32. Diederik P. Kingma and Jimmy Lei Ba. Adam: A method for stochastic optimization. arXiv:1412.6980v9 (2014)

What is claimed is:

1. A computing device to translate an image from a first domain space to a second domain space, the computing device comprising:
 a storage unit storing a generative adversarial network (GAN)-based student generator ($G_S$), configured to translate images from the first domain space to the second domain space, the generator $G_S$ scaled downwardly in relation to a GANs-based teacher generator ($G_T$) also configured to translate images from the first domain space to the second domain space, wherein the generator $G_S$ comprising a configuration which maintains a semantic relation knowledge determined for the generator $G_T$, wherein the generator $G_S$ configuration is conditioned such that:
  a. in each of the generator $G_S$ and the generator $G_T$, at a respective intermediate layer during conditioning, semantic relations are represented by similarity matrices defined by calculating pairwise activation similarities on pixels of a respective feature encoding performed by the generator $G_S$ and the generator $G_T$; and
  b. the knowledge is transferred via a semantic relation knowledge distillation loss on the similarity matrices; and
 a processing unit configured to: receive the image; provide the image to the generator G, to obtain a translated image; and provide the translated image for presenting.

2. The computing device of claim 1, wherein the generator $G_S$ and the generator $G_T$ are defined in accordance with a common network architecture.

3. The computing device of claim 2 wherein the generator $G_S$ is scaled downwardly in terms of width, depth or both width and depth relative to the generator $G_T$, wherein width means a number of filters in each layer and depth means a number of residual blocks in the common network architecture.

4. The computing device of claim 1, wherein the processing unit is configured to provide the translated image in an augmented reality interface to simulate an effect applied to the image.

5. The computing device of claim 4, wherein the effect is any of a makeup effect, a hair effect, a nail effect, and an age simulation effect applied to the image comprising an applicable portion of a subject.

6. The computing device of claim 1, wherein the generator $G_S$ configuration is conditioned by adding the semantic relation knowledge distillation loss in addition to a traditional distillation loss on the final generated images of the generator $G_S$ and the generator $G_T$.

7. The computing device of claim 1, wherein a respective semantic relation activation matrix is calculated as an outer product of the respective feature encoding and the semantic relation knowledge distillation loss compares the respective semantic relation activation matrices of the generator $G_S$ and the generator $G_T$.

8. The computing device of claim 7, wherein the activation matrix is represented by the outer product of feature encoding $\mathcal{F}$, defining the feature encoding $\mathcal{F}(i)$ to be an output matrix of the i-th image example at the last layer of encoder È:

$$\mathcal{F}_t^{(i)} = \hat{E}_t(x_i); \mathcal{F}_s^{(i)} = \hat{E}_s(x_i), \tag{5}$$

$$\mathcal{F}_t^{(i)} \in \mathbb{R}^{1 \times C_t \times H' \times W'} \to \mathcal{F}_t^{(i)} \in \mathbb{R}^{C_t \times (H' \cdot W')},$$

$$\mathcal{F}_s^{(i)} \in \mathbb{R}^{1 \times C_s \times H' \times W'} \to \mathcal{F}_s^{(i)} \in \mathbb{R}^{C_s \times (H' \cdot W')}, \tag{6}$$

where H' and W' indicate feature encoding height and width while $C_t/C_x$ are a number of channels respectively; and wherein using a batch size of 1, semantic relation activation matrices $\mathcal{A} \in \mathbb{R}^{(H' \cdot W') \times (H' \cdot W')}$ are calculated as the outer product of $\mathcal{F}$, followed by a row-wise L2 normalization:

$$\hat{\mathcal{A}}_t = \mathcal{F}_t^{(i)} \cdot \mathcal{F}_t^{(i)T}; \hat{\mathcal{A}}_s = \mathcal{F}_s^{(i)} \cdot \mathcal{F}_s^{(i)T}, \tag{7}$$

$$\mathcal{A}_{t[k,:]} = \frac{\hat{\mathcal{A}}_t}{\sqrt{\sum_j \hat{\mathcal{A}}_{t[k,j]}^2}}; \mathcal{A}_{s[k,:]} = \frac{\hat{\mathcal{A}}_s}{\sqrt{\sum_j \hat{\mathcal{A}}_{s[k,j]}^2}},$$

9. A computing device comprising:
 a face-effect unit including processing circuitry configured to apply at least one facial effect to a source image and to generate one or more virtual instances of an applied-effect source image on an e-commerce interface, the face-effect unit utilizing a generative adversarial network (GAN)-based student generator ($G_S$) to translate images from a first domain space to a second domain space in which the at least one facial effect is applied, the generator $G_S$ scaled downwardly in relation to a GANs-based teacher generator ($G_T$) also configured to translate images from the first domain space to the second domain space; and
 wherein the generator $G_S$ comprises a configuration which maintains a semantic relation knowledge determined for the generator $G_T$, wherein the generator $G_S$ configuration is conditioned such that:
 in each of the generator $G_S$ and the generator $G_T$, at a respective intermediate layer during conditioning, semantic relations are represented by similarity matrices defined by calculating pairwise activation similarities on pixels of a respective feature encoding performed by the generator $G_S$ and the generator $G_T$; and
 the knowledge is transferred via a semantic relation knowledge distillation loss on the similarity matrices.

10. The computing device of claim 9, further comprising:
 a user experience unit including processing circuitry configured to determine at least one product from a data store storing products and to generate one or more virtual instances of a product recommendation on an e-commerce interface to purchase products;
 wherein the at least one product is associated with a respective facial effect and the face-effect unit applies the respective facial effect to provide a virtual try on experience.

11. The computing device of claim 9, wherein a respective semantic relation activation matrix is calculated as an outer product of the respective feature encoding and the semantic relation knowledge distillation loss compares the respective semantic relation activation matrices of the generator $G_S$ and the generator $G_T$.

12. The computing device of claim 11, wherein the activation matrix is represented by the outer product of feature encoding $\mathcal{F}$, defining the feature encoding $\mathcal{F}^{(i)}$ to be an output matrix of the i-th image example at the last layer of encoder È:

$$\mathcal{F}_t^{(i)} = \hat{E}_t(x_i); \mathcal{F}_s^{(i)} = \hat{E}_s(x_i), \tag{5}$$

$$\mathcal{F}_t^{(i)} \in \mathbb{R}^{1 \times C_t \times H' \times W'} \to \mathcal{F}_t^{(i)} \in \mathbb{R}^{C_t \times (H' \cdot W')},$$

$$\mathcal{F}_s^{(i)} \in \mathbb{R}^{1 \times C_s \times H' \times W'} \to \mathcal{F}_s^{(i)} \in \mathbb{R}^{C_s \times (H' \cdot W')}, \quad (6)$$

where H' and W' indicate feature encoding height and width while $C_t/C_x$ are a number of channels respectively; and wherein using a batch size of 1, semantic relation activation matrices $\mathcal{A} \in \mathbb{R}^{(H' \cdot W') \times (H' \cdot W')}$ are calculated as the outer product of $\mathcal{F}$, followed by a row-wise L2 normalization.

$$\hat{\mathcal{A}}_t = \mathcal{F}_t^{(i)} \cdot \mathcal{F}_t^{(i)^T}; \hat{\mathcal{A}}_s = \mathcal{F}_s^{(i)} \cdot \mathcal{F}_s^{(i)^T}, \quad (7)$$

$$\mathcal{A}_{t[k,:]} = \frac{\hat{\mathcal{A}}_t}{\sqrt{\sum_j \hat{\mathcal{A}}_{t[k,j]}^2}}; \mathcal{A}_{s[k,:]} = \frac{\hat{\mathcal{A}}_s}{\sqrt{\sum_j \hat{\mathcal{A}}_{s[k,j]}^2}},$$

13. A computer program product comprising a non-transient storage device storing instructions which when executed by a computing device, configure the computing device to comprise:
 a face-effect unit including processing circuitry configured to apply at least one facial effect to a source image and to generate one or more virtual instances of an applied-effect source image on an e-commerce interface, the face-effect unit utilizing a generative adversarial network (GAN)-based student generator ($G_S$) to translate images from a first domain space to a second domain space in which the at least one facial effect is applied, the generator $G_S$ scaled downwardly in relation to a GANs-based teacher generator ($G_T$) also configured to translate images from the first domain space to the second domain space; and
 wherein the generator $G_S$ comprises a configuration which maintains a semantic relation knowledge determined for the generator $G_T$, wherein the generator $G_S$ configuration is conditioned such that:
  a. in each of the generator $G_S$ and the generator $G_T$, at a respective intermediate layer during conditioning, semantic relations are represented by similarity matrices defined by calculating pairwise activation similarities on pixels of a respective feature encoding performed by the generator $G_S$ and the generator $G_T$; and
 the knowledge is transferred via a semantic relation knowledge distillation loss on the similarity matrices.

14. The computer program product of claim 13, wherein the instructions, when executed, further configure the computing device to comprise:
 a user experience unit including processing circuitry configured to determine at least one product from a data store storing products and to generate one or more virtual instances of a product recommendation on an e-commerce interface to purchase products;
 wherein the at least one product associated with a respective facial effect and the face-effect unit applies the respective facial effect to provide a virtual try on experience.

15. The computer program product of claim 14, wherein the computing device comprises a client computing device of a consumer user and the instructions, when executed, configure the client computing device to communicate with an e-commerce system to determine the at least one product.

16. The computer program product of claim 13, wherein the generator $G_S$ configuration is conditioned using a semantic relation knowledge distillation loss in relation to the generator $G_T$ to transfer the semantic relation knowledge determined for the generator $G_T$ to the generator $G_S$.

17. The computer program product of claim 13, wherein the at least one facial effect is a makeup effect or an age simulation effect applied to a subject from the source image.

18. The computer program product of claim 13, wherein a respective semantic relation activation matrix is calculated as an outer product of the respective feature encoding and the semantic relation knowledge distillation loss compares the respective semantic relation activation matrices of the generator $G_S$ and the generator $G_T$.

19. The computing device of claim 18, wherein the activation matrix is represented by the outer product of feature encoding $\mathcal{F}$, defining the feature encoding $\mathcal{F}^{(i)}$ to be an output matrix of the i-th image example at the last layer of encoder $\hat{E}$:

$$\mathcal{F}_t^{(i)} = \hat{E}_t(x_i); \mathcal{F}_s^{(i)} = \hat{E}_s(x_i), \quad (5)$$

$$\mathcal{F}_t^{(i)} \in \mathbb{R}^{1 \times C_t \times H' \times W'} \to \mathcal{F}_t^{(i)} \in \mathbb{R}^{C_t \times (H' \cdot W')},$$

$$\mathcal{F}_s^{(i)} \in \mathbb{R}^{1 \times C_s \times H' \times W'} \to \mathcal{F}_s^{(i)} \in \mathbb{R}^{C_s \times (H' \cdot W')}, \quad (6)$$

where H' and W' indicate feature encoding height and width while $C_t/C_x$ are a number of channels respectively; and wherein using a batch size of 1, semantic relation activation matrices $\mathcal{A} \in \mathbb{R}^{(H' \cdot W') \times (H' \cdot W')}$ are calculated as the outer product of $\mathcal{F}$, followed by a row-wise L2 normalization.

* * * * *